United States Patent
Yamazaki et al.

(10) Patent No.: US 10,354,150 B2
(45) Date of Patent: Jul. 16, 2019

(54) APPARATUS, METHOD AND PROGRAM FOR GENERATING OCCUPANCY GRID MAP

(71) Applicant: KABUSHIKI KAISHA TOSHIBA, Tokyo (JP)

(72) Inventors: Masaki Yamazaki, Kanagawa (JP); Tsuyoshi Tasaki, Kanagawa (JP); Rie Katsuki, Kanagawa (JP); Tomoki Watanabe, Tokyo (JP); Masahiro Sekine, Tokyo (JP); Manabu Nishiyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/259,108

(22) Filed: Sep. 8, 2016

(65) Prior Publication Data
US 2017/0116487 A1  Apr. 27, 2017

(30) Foreign Application Priority Data
Oct. 22, 2015  (JP) .................. 2015-208195

(51) Int. Cl.
*G06K 9/00* (2006.01)
*G06K 9/46* (2006.01)
(Continued)

(52) U.S. Cl.
CPC ......... *G06K 9/00805* (2013.01); *G05D 1/024* (2013.01); *G05D 1/0251* (2013.01);
(Continued)

(58) Field of Classification Search
None
See application file for complete search history.

(56) References Cited

U.S. PATENT DOCUMENTS

| 7,805,220 B2 * | 9/2010 | Taylor ............... G05D 1/0219 318/568.12 |
| 2007/0005306 A1 * | 1/2007 | Foessel .............. G01S 13/723 702/189 |

(Continued)

FOREIGN PATENT DOCUMENTS

| EP | 2 853 916 A1 | 4/2015 |
| JP | 2003-098256 | 4/2003 |

(Continued)

OTHER PUBLICATIONS

Foka et al., "Probabilistic Autonomous Robot Navigation in Dynamic Environments with Human Motion Prediction," Int J Soc Robot (2010) 2: 79-94.*

(Continued)

*Primary Examiner* — Soo Shin
(74) *Attorney, Agent, or Firm* — Finnegan, Henderson, Farabow, Garrett & Dunner, L.L.P.

(57) ABSTRACT

According to one embodiment, an apparatus for generating an occupancy grid map constituted with a two-dimensional grid around a first moving body includes processing circuitry configured to acquire data of a distance from the first moving body to an obstacle lying in surroundings of the first moving body; acquire first information indicating the movement status of the first moving body at current time and determine an operation mode of the first moving body; set a range of interest in a grid of a resolution higher than a resolution of the grid of the occupancy grid map, from the operation mode; and align the occupancy grid map to the range of interest and generate the occupancy grid map in such a manner that the obstacle exists in the grid of the occupancy grid map and the grid of the range of interest with respect to a position corresponding to the distance data.

12 Claims, 17 Drawing Sheets

(51) Int. Cl.
- G05D 1/02 (2006.01)
- H04N 13/246 (2018.01)
- G06T 7/285 (2017.01)
- G06T 7/593 (2017.01)
- H04N 13/254 (2018.01)
- H04N 13/271 (2018.01)
- H04N 13/239 (2018.01)
- H04N 13/25 (2018.01)
- H04N 13/00 (2018.01)

(52) U.S. Cl.
CPC ......... *G05D 1/0257* (2013.01); *G05D 1/0274* (2013.01); *G06K 9/4604* (2013.01); *G06T 7/285* (2017.01); *G06T 7/593* (2017.01); *H04N 13/239* (2018.05); *H04N 13/246* (2018.05); *H04N 13/25* (2018.05); *H04N 13/254* (2018.05); *H04N 13/271* (2018.05); G05D 1/0248 (2013.01); G05D 2201/0213 (2013.01); G06T 2207/10028 (2013.01); G06T 2207/30261 (2013.01); H04N 2013/0085 (2013.01)

(56) References Cited

U.S. PATENT DOCUMENTS

| | | |
|---|---|---|
| 2009/0184961 A1 | 7/2009 | Hayashi et al. |
| 2013/0138246 A1* | 5/2013 | Gutmann ............. G05D 1/0231 700/253 |
| 2013/0218467 A1 | 8/2013 | Ogawa et al. |
| 2014/0100814 A1* | 4/2014 | Itoh ........................ G01B 11/24 702/152 |
| 2014/0350839 A1* | 11/2014 | Pack ..................... G01C 21/30 701/409 |
| 2015/0269450 A1* | 9/2015 | Tasaki ................ G06K 9/00805 348/148 |
| 2017/0223338 A1* | 8/2017 | Kang ......................... G06T 7/80 |
| 2017/0343669 A1* | 11/2017 | Tasaki ..................... G01S 17/06 |
| 2017/0345182 A1* | 11/2017 | Sano ......................... G06T 7/73 |

FOREIGN PATENT DOCUMENTS

| | | |
|---|---|---|
| JP | 2005-326944 | 11/2005 |
| JP | 2010-102485 | 5/2010 |
| JP | 4650750 | 3/2011 |
| JP | 2011-170762 A | 9/2011 |
| JP | 2012-37980 A | 2/2012 |

OTHER PUBLICATIONS

Foka et al., "Probabilistic Autonomous Robot Navigation in Dynamic Environments with Human Motion Prediction," Int J Soc Robot (2010) 2: 79-94 (Year: 2010).*

* cited by examiner

LEFT IMAGE 7L

LEFT IMAGE
COORDINATE SYSTEM

RIGHT IMAGE 7R

RIGHT IMAGE
COORDINATE SYSTEM

INITIALIZATION

TRACKING

SUBSEQUENT TRACKING

APPARATUS, METHOD AND PROGRAM FOR GENERATING OCCUPANCY GRID MAP

CROSS-REFERENCE TO RELATED APPLICATIONS

This application is based upon and claims the benefit of priority from the prior Japanese Patent Application No. 2015-208195, filed on Oct. 22, 2015; the entire contents of which are incorporated herein by reference.

FIELD

Embodiments described herein relate generally to an apparatus, method and program for generating an occupancy grid map.

BACKGROUND

In order to implement an automatic driving support system for an automobile, it is necessary to analyze ambient environments of the automobile and generate a path of the automobile. The path is generated by detecting obstacles, such as pedestrians and other automobiles and so on, from data obtained from stereo cameras, laser sensors and so on, dividing the surroundings of the automobile into grids, and using an occupancy grid map expressing obstacles in each grid in time series.

However, with respect to the occupancy grid map, increasing the number of grids per unit of the overall occupancy grid map to increase a higher resolution causes a problem in that the processing time is extended and a used memory capacity is accordingly increased.

In order to overcome the above problem, it is, therefore, an object of an embodiment of the present invention to provide an apparatus, method, and program for generating an occupancy grid map, which is capable of increasing a resolution of only an important range in the occupancy grid map.

DETAILED DESCRIPTION

Figure 1:
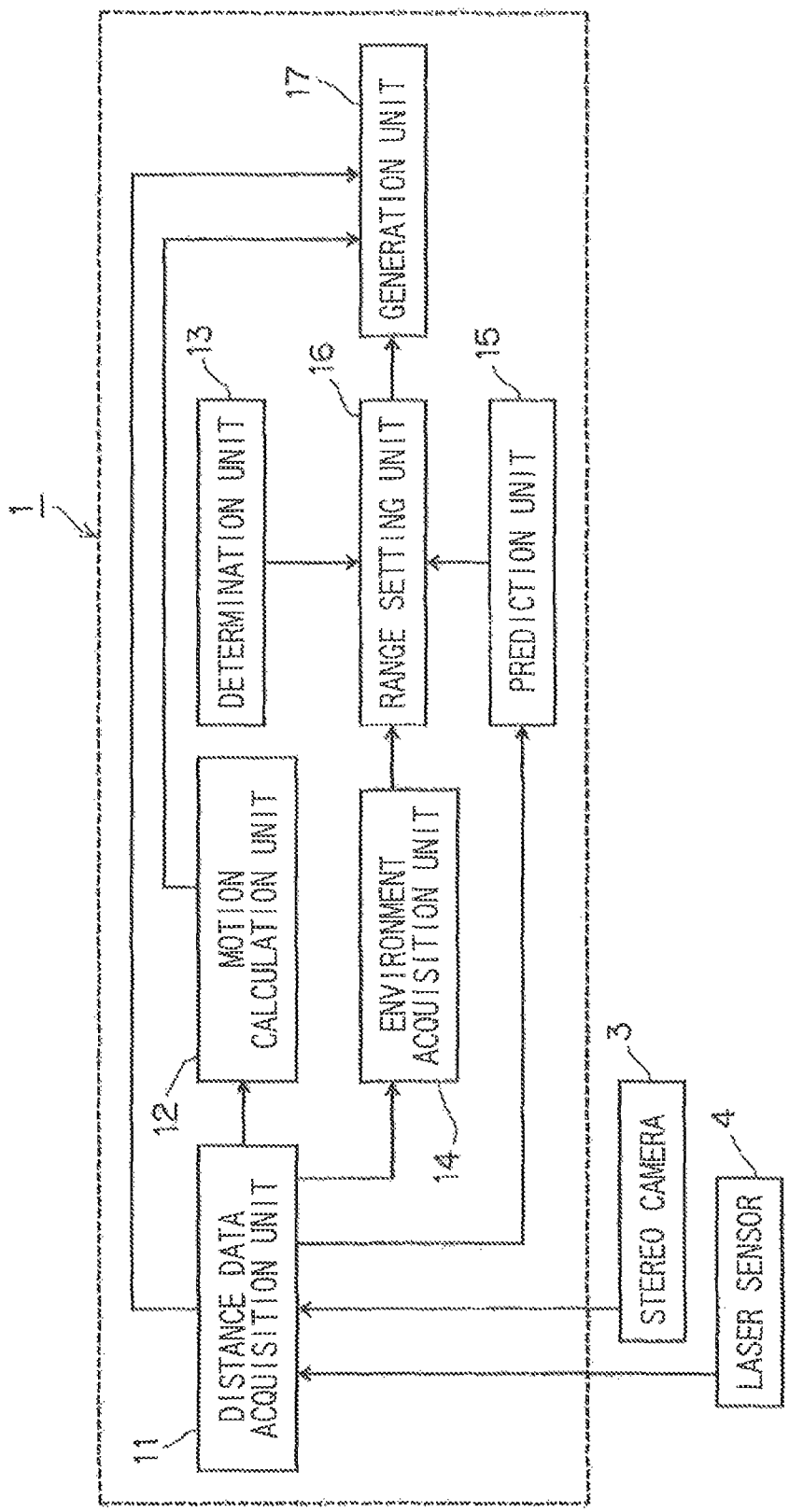
FIG. 1 is a block diagram illustrating an occupancy grid map generating apparatus according to a first embodiment.

According to one embodiment, there is provided an apparatus for generating an occupancy grid map constituted with a two-dimensional grid around a first moving body, including processing circuitry configured to: acquire data of a distance from the first moving body to an obstacle lying in surroundings of the first moving body; acquire first information indicating a movement status of the first moving body at current time and determine an operation mode of the first moving body; set a range of interest, which is a movement range of the first moving body at next time, in a grid of a resolution higher than a resolution of the grid of the occupancy grid map, from the operation mode; and align the occupancy grid map to the range of interest and generate the occupancy grid map in such a manner that the obstacle exists in the grid of the occupancy grid map and the grid of the range of interest with respect to a position corresponding to the distance data.

According to another embodiment, there is provided an apparatus for generating an occupancy grid map constituted with a three-dimensional grid around a first moving body, including processing circuitry configured to: acquire data of a distance from the first moving body to an obstacle lying in surroundings of the first moving body; acquire first information indicating a movement status of the first moving body at current time and determine a three-dimensional movement vector of the first moving body; set a range of interest, which is a movement range of the first moving body at next time, in a grid of a resolution higher than a resolution of the grid of the occupancy grid map, from the three-dimensional movement vector; and align the occupancy grid map to the range of interest and generate the occupancy grid map in such a manner that the obstacle exists in the grid of the occupancy grid map and the grid of the range of interest with respect to a position corresponding to the distance data.

Hereinafter, an occupancy grid map generating apparatus 1 of an embodiment of the present invention will be described with reference to the drawings. Throughout the description and the drawings, the same and similar elements, operation and processes will be denoted by the same reference numerals, and overlapping descriptions thereof will be omitted.

An occupancy grid map generating apparatus 1 of a first embodiment is to generate an occupancy grid map for a path (runway) of a moving body such as an automobile moving on a two-dimensional plane. The occupancy grid map divides the two-dimensional plane into lattice-like grids (pixels) and expresses the presence or absence of an obstacle in the unit of pixel.

An occupancy grid map generating apparatus 1 of a second embodiment, is to generate an occupancy grid map for a path (airway) of a moving body such as an unmanned aerial vehicle (UAV) moving on a three-dimensional space. The occupancy grid map divides the three-dimensional space into cubic or rectangular parallelepiped lattice-like grids (voxels) and expresses the presence or absence of an obstacle in the unit of voxel.

The occupancy grid map generating apparatus 1 of the first embodiment is, for example, a dedicated or general-purpose computer. The occupancy grid map generating apparatus 1 includes a bus connecting a stereo camera 3, a laser sensor 4, a processing circuit 5, a memory circuit 6, and a communication device 7.

The processing circuit 5 includes a distance data acquisition unit 11, a motion calculation unit 12, a determination unit 13, an environment acquisition unit 14, a prediction unit 15, a range setting unit 16, and a generation unit 17. Although the function related to this embodiment has been mainly illustrated in the example of FIG. 18, the various units of the processing circuit 5 are not limited thereto. The function of each of the various units will be described in detail later.

Figure 18:
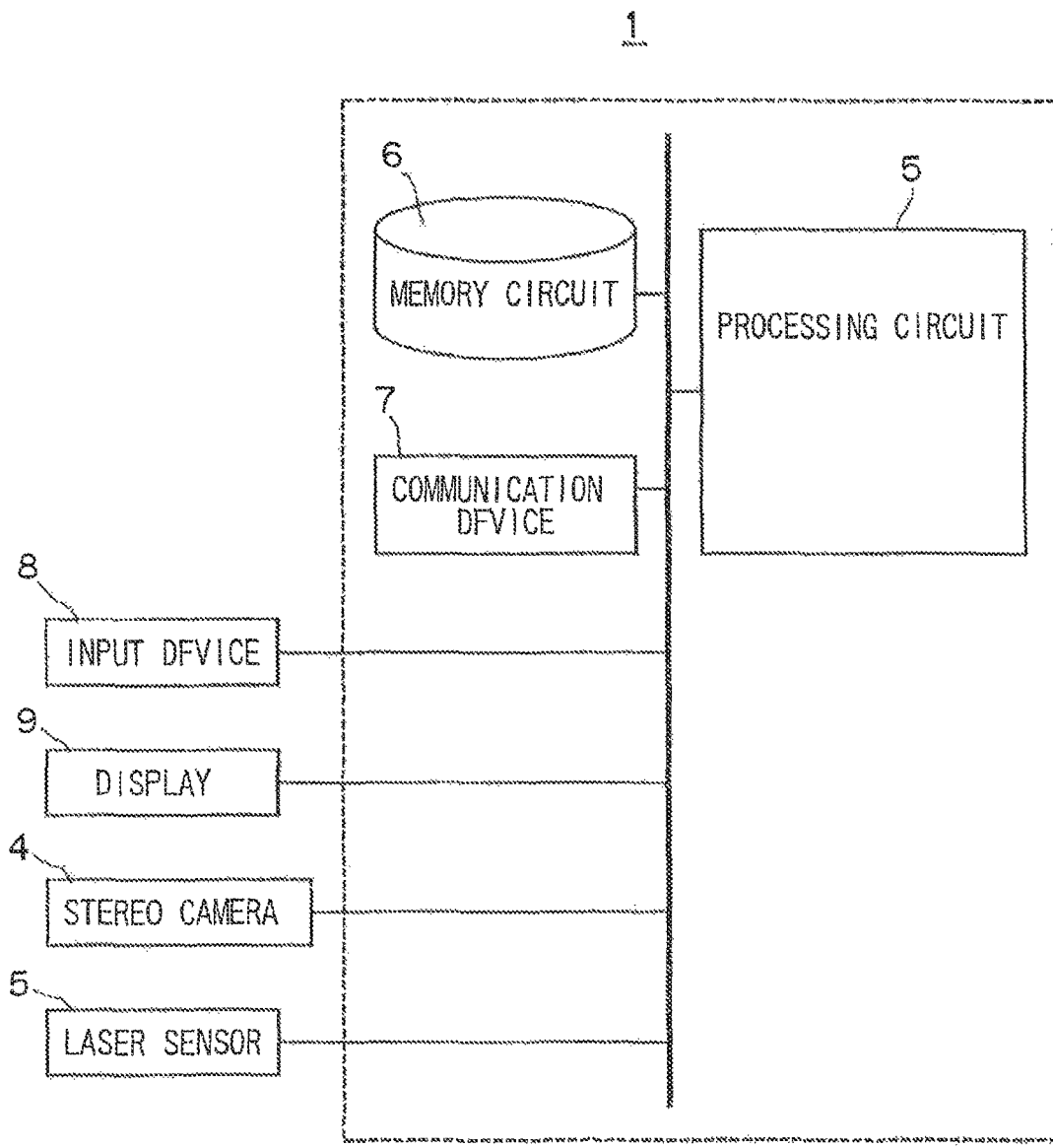
FIG. 18 is a block diagram illustrating the hardware configuration of an occupancy grid map generating apparatus.

The function of each unit performed in the occupancy grid map generating apparatus 1 is stored in the memory circuit 6 in the form of a computer-executable program. The processing circuit 5 is a processor for reading and executing a program from the memory circuit 6 to implement a function corresponding to the program. The processing circuit 5 in a state of reading each program has the function of each unit represented in the processing circuit 5 of FIG. 18. Although it is illustrated in FIG. 18 that the functions performed in the distance data acquisition unit 11, the motion calculation unit 12, the determination unit 13, the environment acquisition unit 14, the prediction unit 15, the range setting unit 16, and the generation unit 17 are implemented in a single processing circuit 5, these functions may be implemented by constructing the processing circuit 5 in combination of a plurality of independent processors and causing the processors to execute their respective programs. Each processing function may be configured as a program, a signal processing circuit 5 may execute each program, or a specified function may be installed in a dedicated independent program executing circuit.

The distance data acquisition unit 11, the motion calculation unit 12, the determination unit 13, the environment acquisition unit 14, the prediction unit 15, the range setting unit 16, and the generation unit 17 included in the processing circuit 5 are examples of a distance data acquisition module, a motion calculation module, a determination module, an environment acquisition module, a prediction module, a range setting module, and a generation module, respectively.

The term "processor" used herein refers to one of, e.g., a central processing unit (CPU), a graphical processing unit (GPU), an application specific integrated circuit (ASIC), and a programmable logic device (e.g., a simple programmable logic device (SPLD), a complex programmable logic device (CPLD) or a field programmable gate array (FPGA)). The processor implements a function by reading and executing a program stored in the memory circuit 6. Instead of storing a program in the memory circuit 6, the program may be directly inserted in a circuit of the processor. In this case, the processor implements the function by reading and executing the program inserted in the circuit of the processor.

The memory circuit 6 stores data (e.g., an occupancy grid map) and the like associated with the functions of the various units performed by the processing circuit 5, as necessary. The memory circuit 6 stores programs of the functions of the various units. For example, the memory circuit 6 is a semiconductor memory device such as a random access memory (RAM), a flash memory or the like, a hard disk, an optical disc, or the like. A process performed by the memory circuit 6 in the processing circuit 5 may be performed by an external storage device of the occupancy grid map generating apparatus 1. The memory circuit 6 may be a storage medium which stores or temporarily stores a program downloaded from a local area network (LAN), the Internet or the like. The storage medium is not limited to a single form. The storage medium may be included in the storage medium of the embodiment even when the process in the above-described embodiment is executed from a plurality of media. The storage medium may have any configuration.

The communication device 7 is an interface for performing an input/output operation of information with an external device connected either by a wire or wirelessly. The communication device 7 may conduct communication in access to a network. For example, the communication device 7 acquires position information of an automobile 2 measured by GPS and information (accident, congestion or the like) about road conditions.

An input device 8 receives a variety of instructions and information related to the occupancy grid map generating apparatus 1 from an operator. The input device 8 is, e.g., a pointing device such as a mouse, a trackball or the like, or a keyboard or the like.

A display 9 displays a variety of information about the occupancy grid map generating apparatus 1. The display 9 is a display device such as a liquid crystal display device. The display 9 displays, e.g., an image of an occupancy grid map.

In this embodiment, the input device 8 and the display 9 are connected to the occupancy grid map generating apparatus 1 either by a wire or wirelessly. The input device S and the display 9 may be connected to the occupancy grid map generating apparatus 1 via a network.

In one embodiment, a computer or an insertion system is provided to execute each process in the embodiment, based on a program stored in a storage medium and may be a personal computer or a microcomputer, or alternatively may be any system including a plurality of devices connected to a network.

The term "computer" used herein is not limited to a personal computer but may refer generally to devices and apparatuses capable of implementing the functions in the embodiment by means of a program, including an arithmetic processing device included in an information processing apparatus, a microcomputer, etc.

Although the occupancy grid map generating apparatus 1 of the first embodiment has been described above, the above description can be equally applied to an occupancy grid map generating apparatus 1 of a second embodiment to be described later.

First Embodiment

The occupancy grid map generating apparatus 1 of the first embodiment will be described in more detail with reference to FIGS. 1 to 15. In this embodiment, the occupancy grid map generating apparatus 1 generates an occupancy grid map M of a two-dimensional plane of the surroundings of an automobile 2 (a first moving body). That is, as illustrated in FIGS. 6 to 12, the occupancy grid map generating apparatus 1 always presents the automobile 2 on the center of the occupancy grid map M divided into pixels and generates the occupancy grid map M expressing the presence or absence of an obstacle in the unit of pixel for each time T.

The configuration of the occupancy grid map generating apparatus 1 will be described based on the block diagram of FIG. 1. The occupancy grid map generating apparatus 1 includes the distance data acquisition unit 11, the motion calculation unit 12, the determination unit 13, the environment acquisition unit 14, the prediction unit 15, the range setting unit 16, and the generation unit 17, as described above.

The automobile 2 is provided with the stereo camera 3 as an imaging device, and the laser sensor 4.

The distance data acquisition unit 11 acquires left and right images 7L and 7R obtained from the stereo camera 3 and data of three-dimensional distance to an object lying in the vicinity of the automobile 2, which are obtained by the laser sensor 4.

The motion calculation unit 12 calculates a motion of the automobile 2 from the left and right images 7L and 7R and distance data acquired by the distance data acquisition unit 11.

The determination unit 13 acquires "automobile information," which is first information of the automobile 2, and determines an operation mode of the automobile 2.

The environment acquisition unit 14 acquires environment information about a path along which the automobile 2 is travelling.

The prediction unit 15 predicts a movement destination D after a few seconds of "other moving body" (other automobile, a walker or the like) (a second moving body) which is in the vicinity of the automobile 2.

The range setting unit 16 sets a path candidate C and a range of interest A of a high resolution from the operation mode determined by the determination unit 13, the movement destination D of other moving body predicted by the prediction unit 15, and the environment information acquired by the environment acquisition unit 14.

The generation unit 17 generates the occupancy grid map M cantered at the automobile 2 from the three-dimensional distance data acquired by the distance data acquisition unit 11 and the attitude and the status of movement in real scale of the automobile 2 acquired from the motion calculation unit 12, and sets the range of interest A.

A process of the occupancy grid map generating apparatus 1 will be described based on a flow chart of FIG. 2.

At Step S1, the distance data acquisition unit 11 acquires the left and right images 7L and 7R from the stereo camera 3 installed in the automobile 2 and the data of three-dimensional distance to the object (obstacle), which lies in the vicinity of the automobile 2, from the laser sensor 4.

At Step S2, the motion calculation unit 12 calculates the motion (the attitude and the status of movement in real scale) of the automobile 2.

At Step S3, the determination unit 13 acquires the automobile information and determines the operation mode of the automobile 2.

At Step S4, the environment acquisition unit 14 acquires the environment information about the path of the automobile 2.

At Step S5, the prediction unit 15 predicts the movement destination D after a few seconds (e.g., 1 to 3 seconds) of other moving body which is in the vicinity of the automobile 2.

At Step S6, the range setting unit 16 calculates the path candidate C of the automobile 2 and the range of interest A of a high resolution from the operation mode determined by the determination unit 13, the movement destination D of other moving body predicted by the prediction unit 15, and the environment information acquired by the environment acquisition unit 14.

At Step S7, the generation unit 17 generates the occupancy grid map M centered at the automobile 2 from the distance data acquired by the distance data acquisition unit 11, the attitude of the automobile 2 acquired by the motion calculation unit 12, and the range of interest A of high resolution.

At Step S8, the generation unit 17 updates the occupancy grid map M to the next time.

At Step S9, when the automobile 2 arrives at the destination, the update of the occupancy grid map M is terminated. When the automobile 2 does not yet arrive at the destination, the process returns to Step S1.

The distance data acquisition unit 11 will be described. The distance data acquisition unit 11 acquires the data of a distance to the object (obstacle), which lies in the vicinity of the automobile 2, from the stereo camera 3 and the laser sensor 4 which are installed in the automobile 2 (see Step S1 in FIG. 2). The stereo camera 3 is constituted with a left camera 3L and a right camera 3R.

It is here assumed that, for example, a calibration for calculating focal length data or the like of the stereo camera 3, a calibration for calculating the relative position between the left and right cameras 3L and 3R of the stereo camera 3 and their attitudes, and a calibration for calculating the positional relationship (rotation and translation) between the stereo camera 3 and the laser sensor 4 have bees already performed.

Coordinate systems used in this embodiment may include three kinds of coordinate systems, i.e., a pixel orthogonal coordinate system, a camera coordinate system, and an image coordinate system.

The pixel orthogonal coordinate system is a two-dimensional orthogonal coordinate system which is composed of a p axis and a q axis and is set for the two-dimensional planar occupancy grid map M for each time T. The origin of the pixel orthogonal coordinate system is set at the center of the automobile 2, and the direction of the p axis is set at the runway direction of the automobile 2 at the time T.

Figure 3:
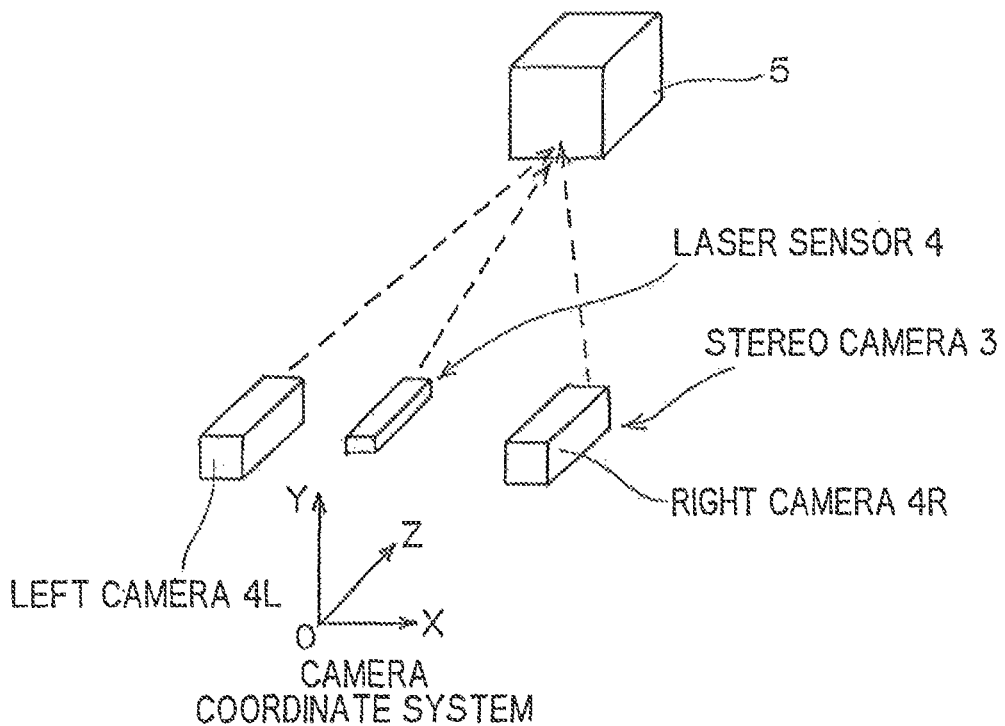
FIG. 3 is an explanatory view of a camera coordinate system.

As illustrated in FIG. 3, the camera coordinate system is a three-dimensional orthogonal coordinate system composed of a horizontal X axis, a vertical Y axis, and a depth-wise Z axis. The origin of the camera coordinate system is set at the center of the automobile 2, and the camera coordinate system is pre-calibrated such that the Z axis coincides with the p axis (travelling direction) of the pixel orthogonal coordinate system.

Figure 4A:
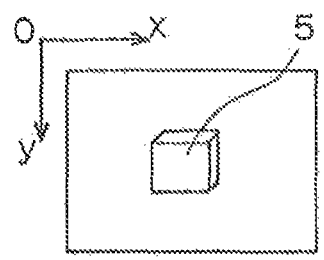
FIGS. 4A and 4B are explanatory views of an image coordinate system.
Figure 4B:
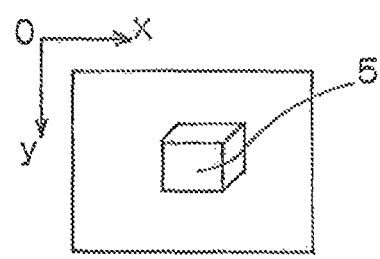

As illustrated in FIGS. 4A and 4B, the image coordinate system is a two-dimensional orthogonal coordinate system composed of a horizontal X axis and a vertical Y axis on the left and right images 7L and 7R obtained from the left and right cameras 3L and 3R, respectively.

The stereo camera 3 will be described. The distance data acquisition unit 11 acquires the data of three-dimensional distance to the object, which lies in the vicinity of the automobile 2, from the left and right images 7L and 7R obtained from the stereo camera 3. The stereo camera 3 preferably images the travelling direction of the automobile 2. However, for calibration, there is no limitation in a position and angle at which the stereo camera 3 is installed. The stereo camera 3 may be a digital camera capable of receiving visible light, a digital camera capable of receiving an infrared ray, or the like.

In order to acquire the three-dimensional distance data from the stereo camera 3, the distance data acquisition unit 11 performs the following operations. First, the distance data acquisition unit 11 searches for correspondence positions of features between the left and right images 7L and 7R obtained from the stereo camera 3. The correspondence position search is obtained by setting small areas around the features and evaluating a similarity between brightness patterns of the left and right images 7L and 7R by means of SSD (Sum of Squared Difference) or the like. Next, since the relative position between the left and right cameras 3L and 3R of the stereo camera 3 and their attitudes are already calibrated, the distance data acquisition unit 11 obtains the three-dimensional positions of the features based on the positional relationship between the features on the left and right images 7L and 7R and the spatial positional relationship between the left and right cameras 3L and 3R.

The laser sensor 4 will be described. The distance data acquisition unit 11 acquires the three-dimensional distance data obtained by irradiating a laser beam from the laser sensor 4 and measuring reflected light of the laser beam reflected by the obstacle. The laser sensor 4 preferably irradiates the travelling direction of the automobile 2. However, there is no limitation in a position and angle at which the laser sensor 4 is installed in the automobile 2.

The laser sensor 4 may employ, e.g., a time difference system of calculating distance data by measuring a time taken for a laser beam from being emitted to being reflected by and retuning from an obstacle, a phase difference system of obtaining data of a distance to an object based on a phase difference between diffused reflected components of a plurality of modulated laser beams which are emitted to and returned from the object, etc. Besides, the laser sensor 4 may employ a millimeter-wave radar using a millimeter wave.

The motion calculation unit 12 will be described. The motion calculation unit 12 calculates the motion of the automobile 2 (the attitude and the status of movement in real scale) from the left and right images 7L and 7R acquired by the stereo camera 3 (see, e.g., Step S2 in FIG. 2).

The term "attitude" used herein refers to a rotation matrix R of the automobile 2. The rotation matrix R refers to an orientation which occurs, for example, when the automobile 2 turns left or right in a period of time between time T0 and time T1.

The term "the status of movement in real scale" used herein refers to a translation vector t actually scaled in real. The translation vector t is a vector representing a difference between a position, vector v1 of the automobile 2 at time T1 and a position vector v2 of the automobile 2 at time T2, and represents a movement distance (a scalar quantity of the translation vector) of the automobile 2 in real scale (real distance).

An initial rotation matrix is assumed as the unitary matrix, and an initial translation vector is assumed as a zero matrix.

A method for the motion calculation unit 12 to calculate the attitude and the status of movement in real scale of the automobile 2 will be described. This method largely includes two major processes.

A first process performed by the motion calculation unit 12 is to obtain a three-dimensional position of a feature 8 in the camera coordinate system. It is here assumed that the motion calculation unit 12 acquires none of the attitude and the status of movement in real scale of the automobile 2 at initial time T0.

Figure 5A:
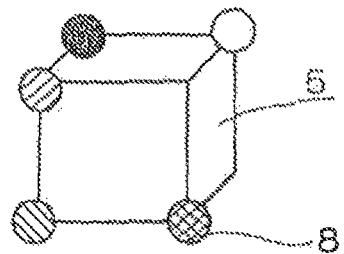
FIGS. 5A, 5B and 5C are explanatory views for calculating a position attitude of an automobile.

In a first step of the first process, as illustrated in FIG. 5A, the left and right cameras 3L and 3R of the stereo camera 3 images, e.g., an object 5 whose three-dimensional shape is cubic.

Figure 5B:
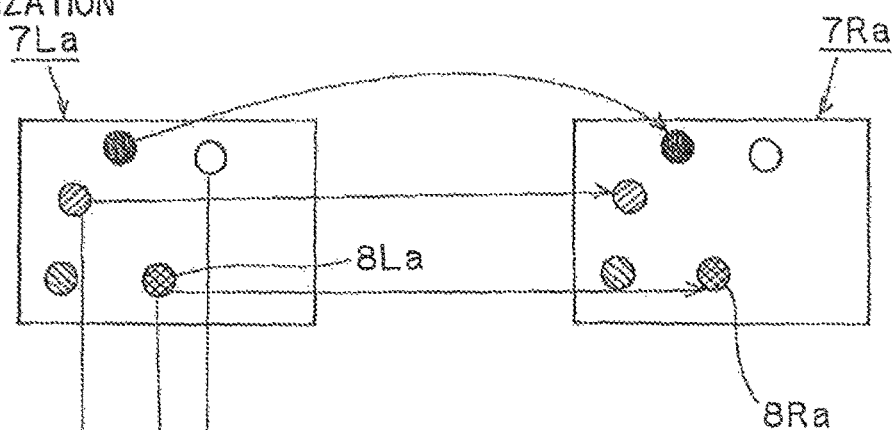

In a second step of the first process, as illustrated in FIG. 5B, the motion calculation unit 12 extracts features 8La and 8Ra from left and right images 7La and 7Ra, respectively. Here, the features 8La and 8Ra correspond to corners of the object 5. In addition, it is desirable that the features 8La and 8Ra are not concentrated on a portion of the images such that other features are not detected within a certain range of the features 8La and 8Ra.

In a third step of the first process, the motion calculation unit 12 searches for correspondence positions of the features 8La and 8Ra between the left and right images 7La and 7Ra. The correspondence position search sets small areas around the feature 8, evaluates a similarity between brightness patterns of the small areas in the left and right images 7La and 7Ra by means of SSD, and determines that the features 8La and 8Ra lie in the small areas, when the similarity is equal to or higher than a predetermined value.

In a fourth step of the first process, the motion calculation unit 12 calculates the three-dimensional position of the feature 8 in the camera coordinate system from the correspondence relationship between the features 8La and 8Ra and the positional relationship between the left and right cameras 3L and 3R according to the principle of triangulation. Since the relative position between the left and right cameras 3L and 3R and their attitudes are already calibrated, the stereo camera 3 obtains the three-dimensional position of the feature 8 in the camera coordinate system based on the positional relationship between the features 8La and 8Ra in the image coordinate system of each of the left and right images 7L and 7R and the spatial positional relationship between the left and right cameras 3L and 3R.

A second process performed by the motion calculation unit 12 is to estimate the attitude and the status of movement in real scale of the automobile 2 at time T1 based on the image position of the feature 8 in the image coordinate system of the left image 7Lb, the image position of the feature 8 in the image coordinate system of the right image 7Rb, and the three-dimensional position of the feature 8 in the camera coordinate system obtained in the first process. In addition, the motion calculation unit 12 estimates the attitude and the status of movement in real scale of the automobile 2 for each time T by repeating the first process and the second process. Here, for time T, T0<T1.

Figure 5C:
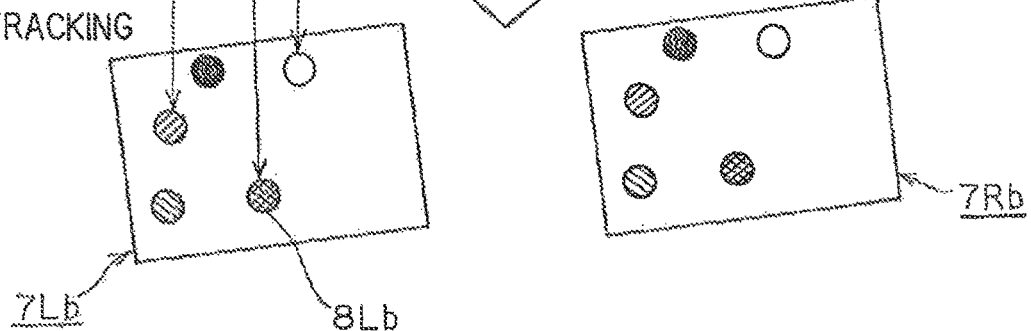

In a first step of the second process, as illustrated in FIG. 5C, the left and right images 7Lb and 7Rb are input to the motion calculation unit 12 at time T1 subsequent to initial time T0.

In a second step of the second process, the motion calculation unit 12 detects features 8Lb and 8Rb matching the features 8La and 8Ra at initial time T0, which are detected in the first process, for the left and right images 7Lb and 7Rb input at time T1 and obtains left and right image coordinate values in the image coordinate systems of the left and right images 7Lb and 7Rb.

In a third step of the second process, the motion calculation unit 12 associates the positions of the left and right images 7Lb and 7Rb with each other at time T1 (feature tracking process) based on the obtained left and right, image coordinate values in the image coordinate systems of the left and right images 7Lb and 7Rb of the detected features 8Lb and 8Rb. In addition, if the stereo camera 3 is not significantly moved at time T1 starting from time T0, the motion calculation unit 12 can track the features 8Lb and 8Rb by searching for the surroundings of the features 8La and 8Ra detected in the left and right images 7La and 7Ra at time T0.

In a fourth step of the second process, since the positions of the left and right images 7Lb and 7Rb can be associated with each other at time T1, the motion calculation unit 12 detects the three-dimensional position of the feature 8 in the camera coordinate system of each of the features 8Lb and 8Rb detected in the left and right images 7Lb and 7Rb at time T1.

In a fifth step of the second process, the motion calculation unit 12 uses a cost function C of the following equation (1) to estimate the rotation matrix R and the translation vector t of the automobile 2. The cost function C is designed to project the detected three-dimensional position, of the feature 8 into one (hereinafter referred to as a "reference image") of the left and right images 7L and 7R using a hypothetical rotation matrix R and a hypothetical translation vector t and obtain an optimal rotation matrix R and a translation vector t by varying the hypothetical rotation matrix R and the hypothetical translation vector t in such a way to decrease a difference between a position of the projection and an image coordinate value of a feature on the reference image.

[Eq. 1]

$$C(\hat{R}, \hat{t}) = \min_{R,t} \sum_{i} (x_i - P(R, t)X_i)^2 \qquad (1)$$

Where, xi represents an image coordinate value on the reference image of a defected $i^{th}$ feature, P(R, t) represents a perspective projection matrix and includes a rotation matrix R and a translation vector t of the automobile 2. Xi represents a feature in a three-dimensional position (coordinate value) of a three-dimensional camera coordinate system. In order to minimize the cost function C, nonlinear optimization is performed to obtain the rotation matrix R and a translation vector t.

The determination unit 13 will be now described. The determination unit 13 acquires automobile information of the automobile 2 at time T1 and determines the operation mode of the automobile 2 (see, e.g., Step S3 in FIG. 2).

First, the determination unit 13 acquires the automobile information of the automobile 2 at time T1. The term "automobile information" used herein refers to information indicating the status of movement of the automobile 2, including, for example, a speed of the automobile 2, an operating condition of a brake, left and right direction indicator information (flashing or turning-off of left and right direction indicators), information on whether or not the automobile 2 goes back (backward straight), information on turning-on/off of a hazard lamp, etc. Such automobile information is acquired using, for example, a controller area network (CAN) (which is a kind of in-vehicle network).

Second, the determination unit 13 determines from the automobile information, to which of the following 7 operation modes the automobile 2 corresponds.

Operation mode 1: state where the automobile 2 is stopped;

Operation mode 2: state where the automobile 2 is stopped and the right direction indicator is flashed;

Operation mode 3: state where the automobile 2 is stopped and the left direction indicator is flashed;

Operation mode 4: state where the automobile 2 goes forward;

Operation mode 5: state where the automobile 2 goes forward and the right direction indicator is flashed;

Operation mode 6: state where the automobile 2 goes forward and the left direction indicator is flashed; and Operation mode 7: state where the automobile 2 goes backward.

The determination unit 13 determines to which of states of stop, forward straight, and backward straight the operation condition of the automobile 2 at time T1 belongs, as follows.

First, when the speed of the automobile 2 at time T1 is extremely close to 0, the determination unit 13 may determine that the automobile 2 is stopped. In addition, based on determination on whether there exists the direction indicator information (flashing or turning-off of left and right direction indicators) or back-going (backward straight) information of the automobile information, the determination unit 13 may determine to which of the operation modes 1 to 3 the operation condition of the automobile 2 belongs.

Next, when the speed of the automobile 2 at time T1 is not 0, the determination unit 13 may determine that the automobile 2 goes straight. In addition, based on the determination on whether there exists the direction indicator information or back-going information of the automobile information, the determination unit 13 may determine to which of the operation modes 4 to 7 the operation condition of the automobile 2 belongs.

The environment acquisition unit 14 will now be described. The environment acquisition unit 14 acquires environment information of a path (road) along which the automobile 2 is travelling at time T1, and represents and stores a three-dimensional position of an environment object 6, which is indicated as the environment information, in the camera coordinate system (see Step S4 in FIG. 2).

The term "environment information" used herein may include the presence of a road sign 6A of a road on which the automobile 2 is travelling, a lighting state of a traffic signal 6B, the presence of a white line 6C, the presence of a guard rail 6D, the presence of a guide post 6E, the presence of a crosswalk 6F, etc. The road sign 6A is the contents of a bulletin board which is placed beside a road and indicates traffic regulation and so on. The guard rail 6D is installed in a boundary between a shoulder and a sidewalk of a road, a median, strip of the road, etc. The guide post 6E is installed in a break (car stop) bet we en a roadway and a sidewalk, a break portion between the lanes, etc.

The term "environment object 6" used herein refers to the road sign 6A, the traffic signal 6B, the white line 6G, the guard rail 6D, the guide post 6E, the crosswalk 6F and so on indicated in the environment information.

The environment acquisition unit 14 acquires such environment information by means of a communication device such as a car navigator or the like, a radio device installed on a road, or a car-to-car communication device, or from an image acquired by the stereo camera 3 installed in the automobile 2 by using an image recognition technique.

The environment, acquisition unit 14 obtains data of three-dimensional distance to the environment object 6 indicated by the environment information in the camera coordinate system, based on the attitude and the status of movement in real scale of the automobile 2 acquired by the motion calculation unit 12 at time T1, and sets the environment object 6 at a three-dimensional position corresponding to the distance data, and represents and stores the three-dimensional position in the camera coordinate system. A method of obtaining the data of the three-dimensional distance to the environment object 6 may use data of a three-dimensional distance to an ambient object of the automobile 2 acquired by the distance data acquisition unit 11. In addition, when the environment object 6 indicated by the environment information matches an object, this method may use data of a three-dimensional distance to the matched object.

The prediction unit 15 will be described. The prediction unit 15 predicts a movement destination D after (T1−T0) seconds of other moving body (other automobile, a walker or the like) which is moving around the automobile 2 at time T1, and represents and stores the movement destination D in the camera coordinate system (see Step S5 in FIG. 2).

In order to predict a movement destination D after (T2−T1) seconds of other moving body (other automobile, a walker or the like) at time T1, the prediction unit 15 has to track a position of other moving body at each time of the stereo camera 3, the lase sensor 4 and the like installed in the automobile 2.

The prediction unit 15 tracks the position of other moving body by means of a radio device installed on a road, or a car-to-car communication device, or from the data acquired by the stereo camera 3 and the laser sensor 4 installed in the automobile 2 by using an image recognition technique or the like. In other words, the prediction unit 15 acquires a position, attitude and velocity vector of other moving body at time T1, based on the attitude and the status of movement in real scale of the automobile 2 acquired by the motion calculation unit 12, obtains the movement destination D of other moving body by obtaining a position, attitude and velocity vector of other moving body after (T1−T0) seconds, based on the acquired position, attitude and velocity vector of other moving body at time T1, and represents and stores the movement destination D in the camera coordinate system.

The range setting unit 16 will be described. The range setting unit 16 represents and sets the path candidate C and the range of interest A of the automobile 2 at time T1 in the three-dimensional range in the camera coordinate system, based on the operation modes 1 to 7 determined toy the determination unit 13, the movement destination D of other moving body predicted by the prediction unit 17, and the environment information acquired by the environment acquisition unit 14 (see, e.g., step S6 in FIG. 2).

First, the path candidate C will be described. The range setting unit 16 uses an operation mode determined by the determination unit 13 to represent and set the path candidate C of the automobile 2 at time T1 in the three-dimensional range in the camera coordinate system. This path candidate C is divided into pixels in the same way as the occupancy grid map M. The size of one pixel is set to be equal to the size of one pixel of the occupancy grid map M.

Figure 6:
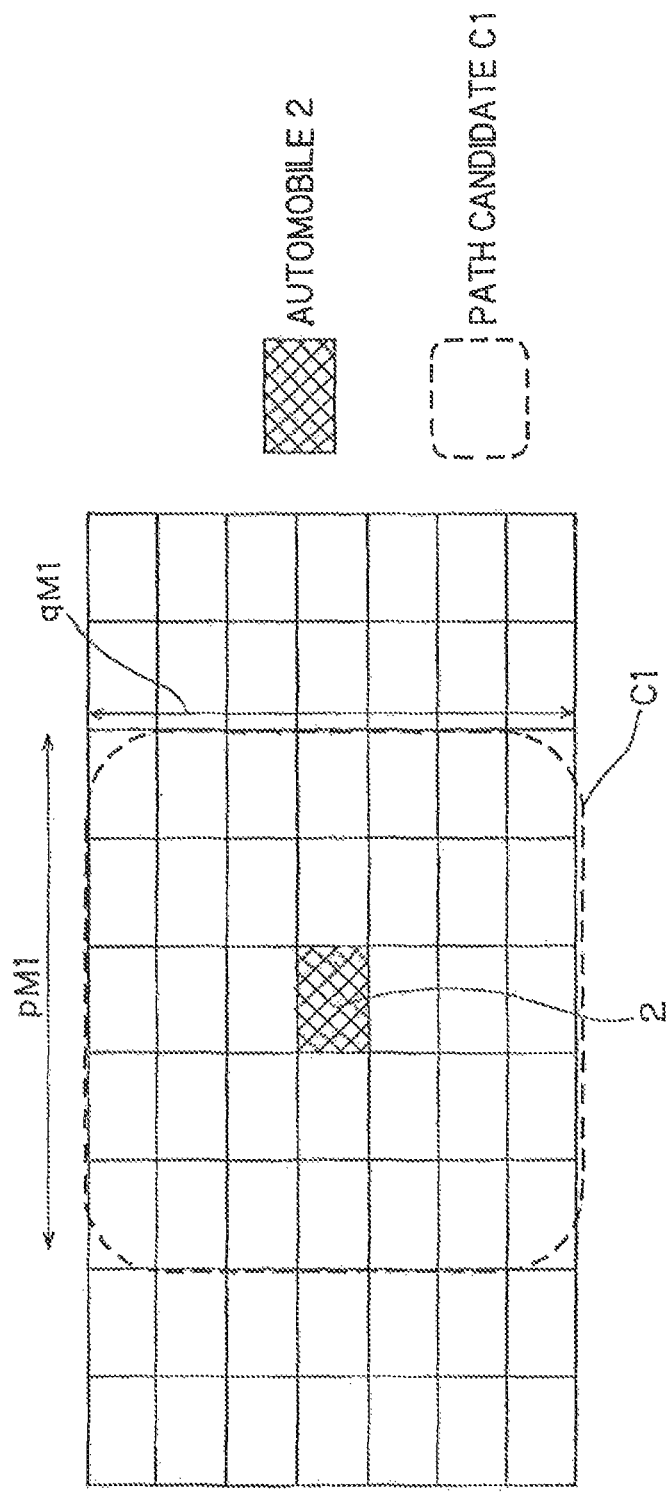
FIG. 6 is an explanatory view of a path candidate C1.

As illustrated in FIG. 6, in a case of operation mode 1 at time T1, the range setting unit 16 sets a path candidate C1 within a front-rear range pM1 and a left-right range qM1 around the automobile 2. The size of the front-rear range pM1 and left-right range qM1 around the automobile 2 is expressed by the size of pixel (pixel size in front, rear, left, and right) in the pixel orthogonal coordinate system represented in the occupancy grid map M.

Figure 7:
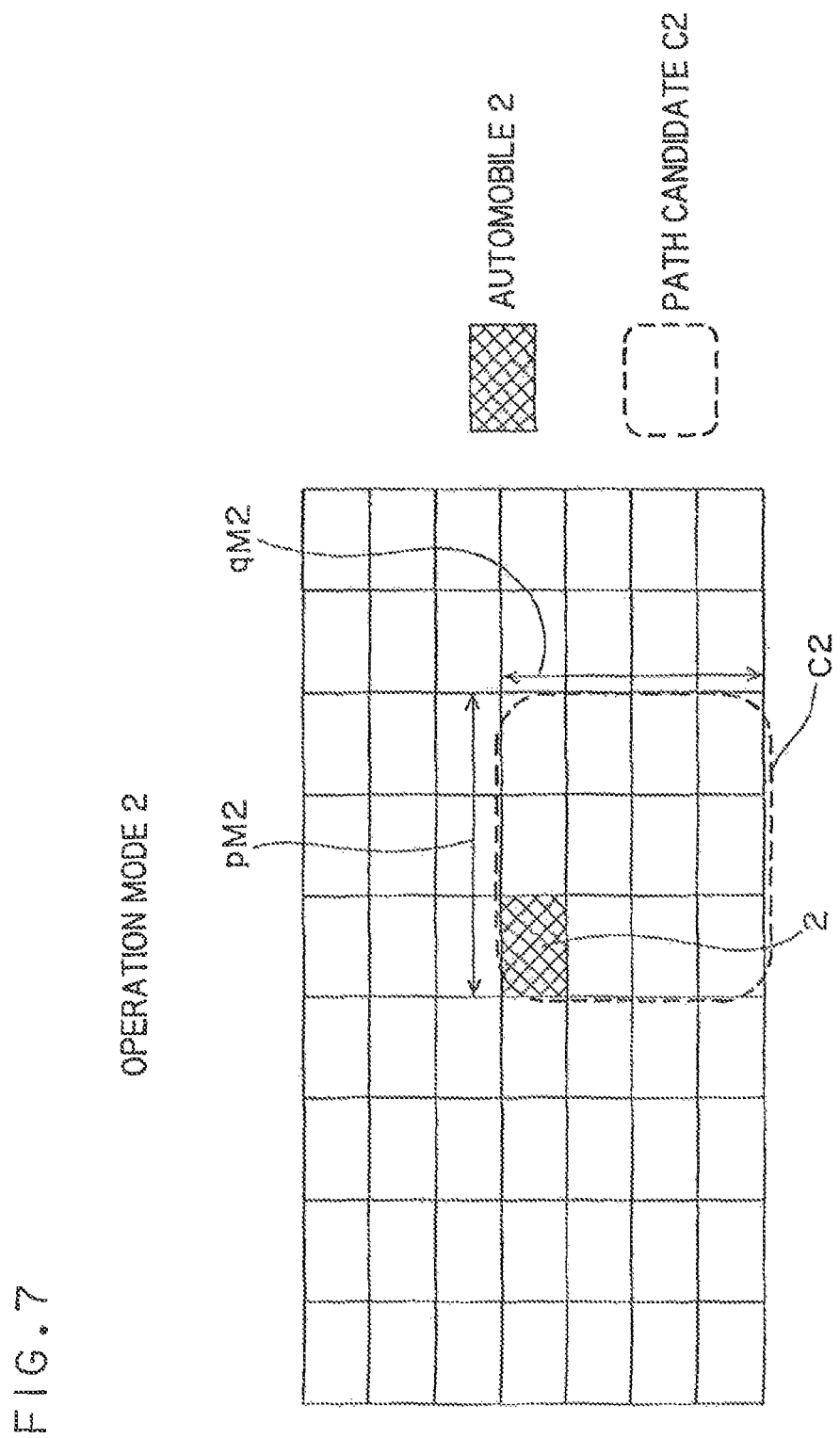
FIG. 7 is an explanatory view of a path candidate C2.

As illustrated in FIG. 7, in a case of operation mode 2 at time T1, the range setting unit 16 sets a path candidate C2 within a front range pM2 and a right range qM2 in front and right around the automobile 2.

Figure 8:
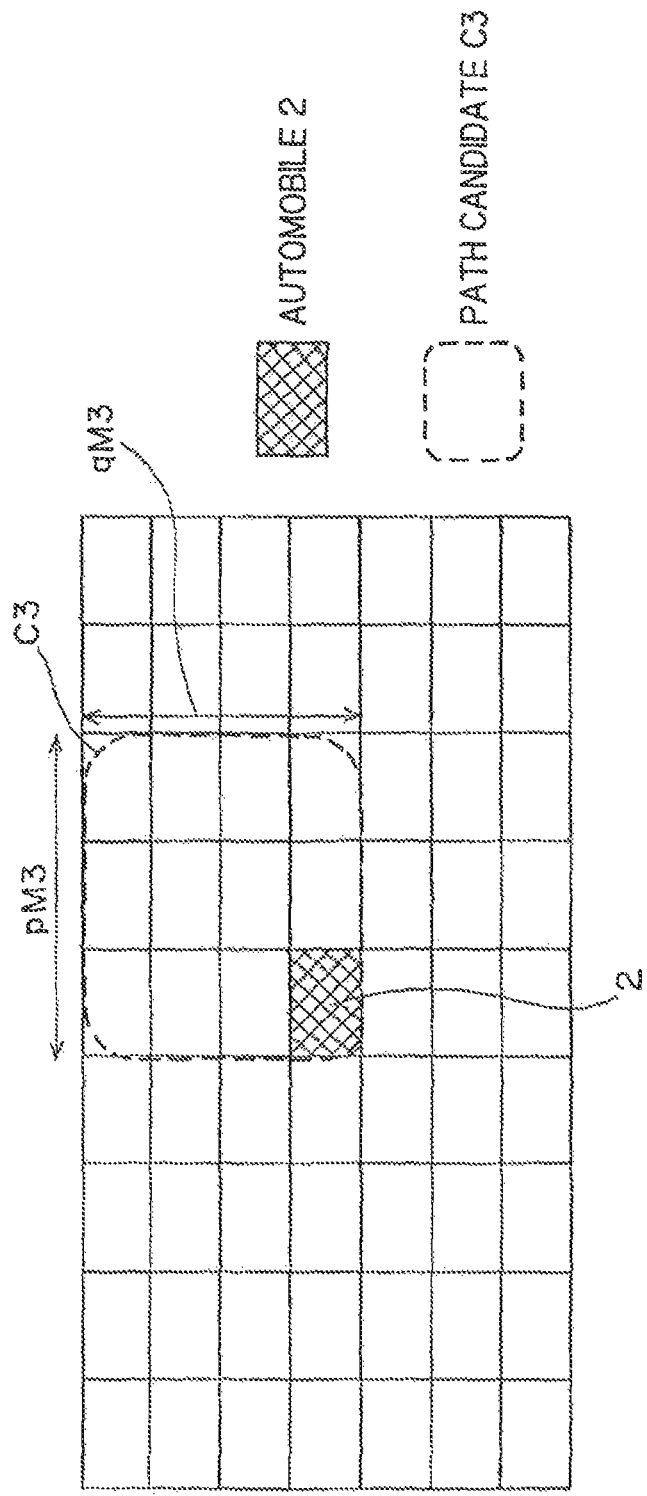
FIG. 8 is an explanatory view of a path candidate C3.

As illustrated in FIG. 8, in a case of operation mode 3 at time T1, the range setting unit 16 sets a path candidate C3 within a front range pM3 and a left range qM3 in front and left around the automobile 2.

Figure 9:
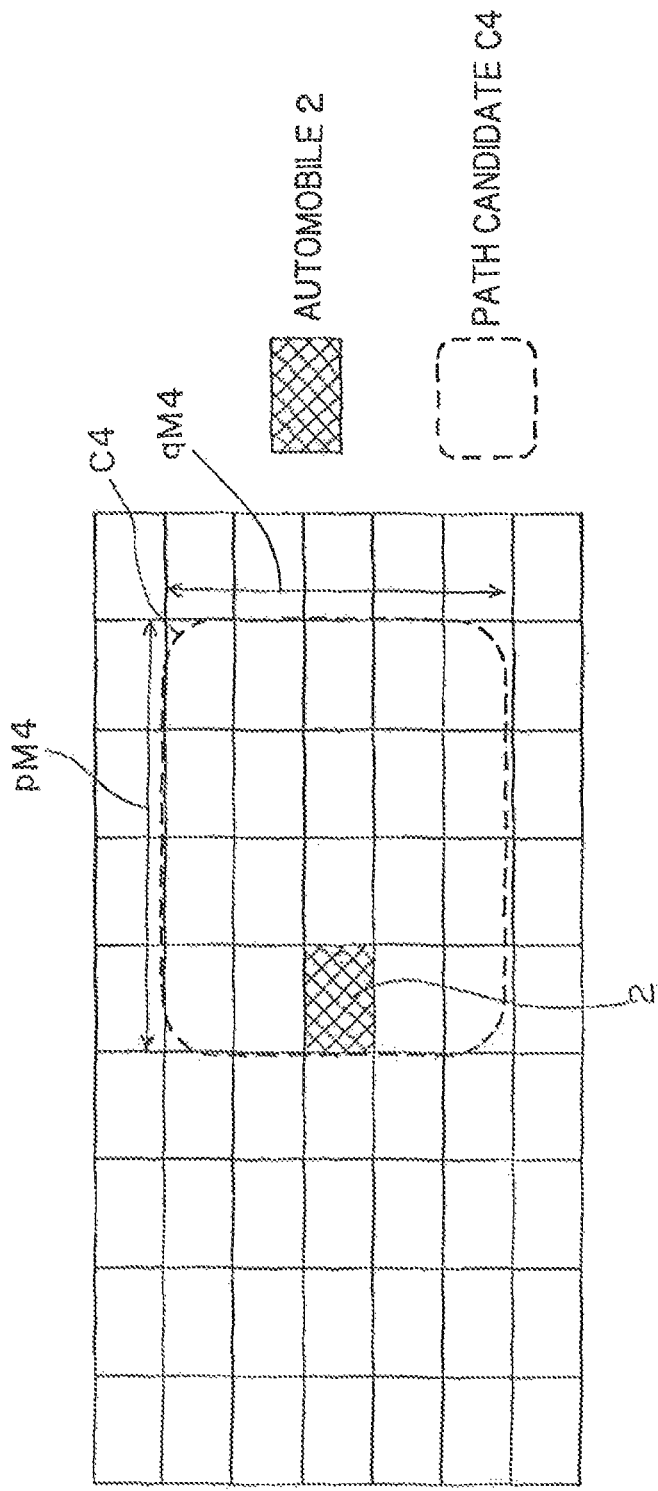
FIG. 9 is an explanatory view of a path candidate C4.

As illustrated in FIG. 9, in a case of operation mode 4 at time T1, the range setting unit 16 sets a path candidate C4 within a front range pM4 and a left-right range qM4 around the automobile 2.

Figure 10:
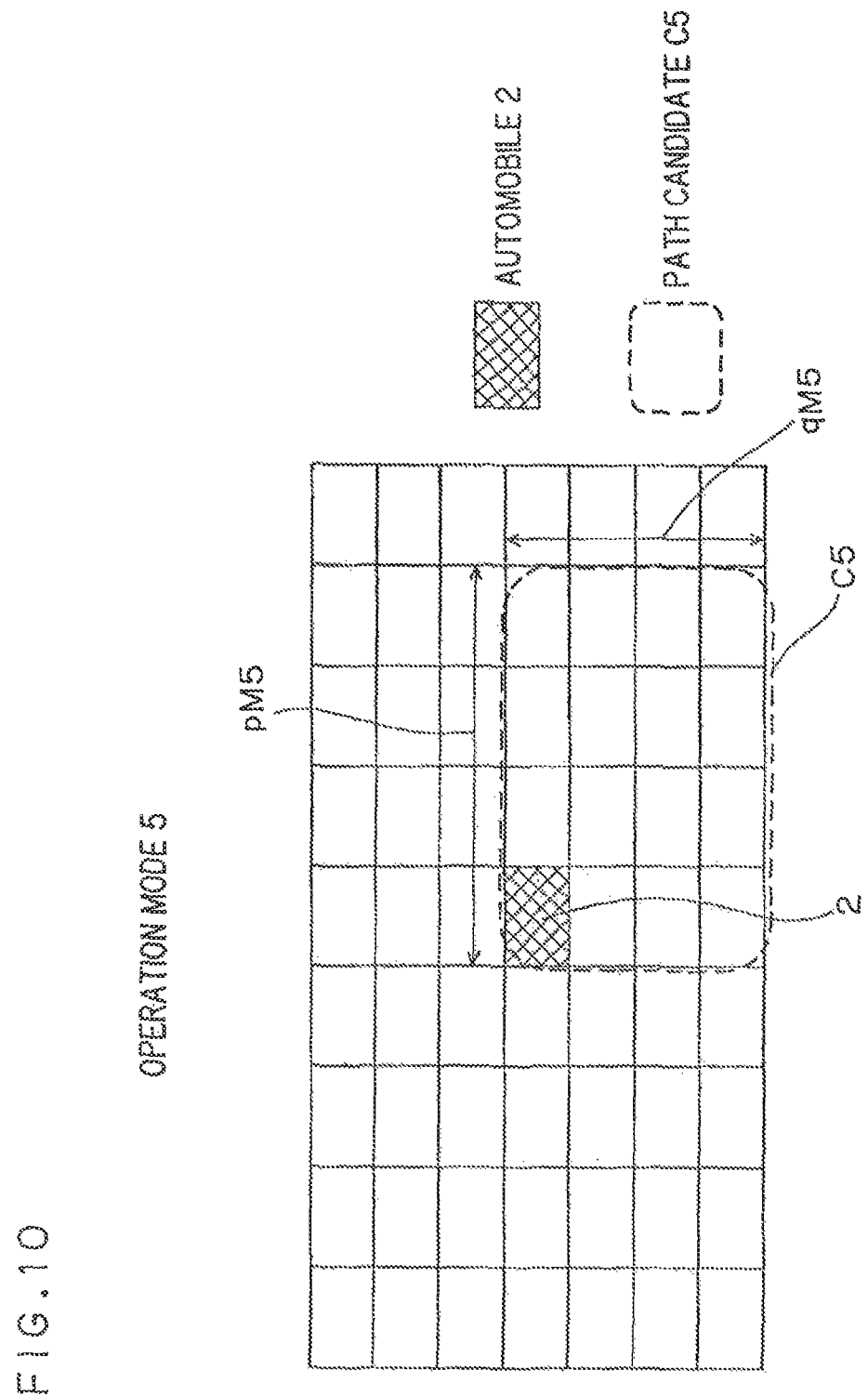
FIG. 10 is an explanatory view of a path candidate C5.

As illustrated in FIG. 10, in a case of operation mode 5 at time T1, the range setting unit 16 sets a path candidate C5 within a front range pM5 and a right range qM5 in front and right around the automobile 2. Since the automobile 2 goes straight forward, the path candidate C5 has a wider range than the path candidate C2.

Figure 11:
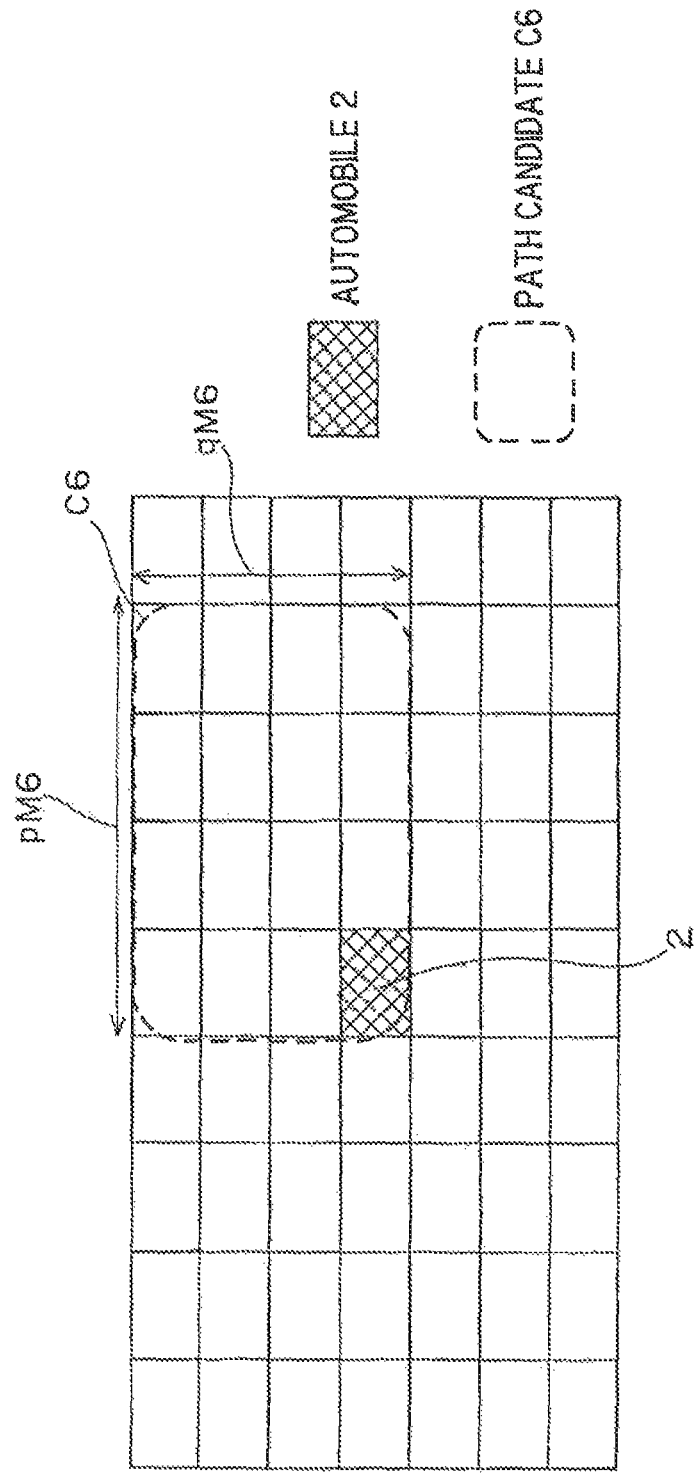
FIG. 11 is an explanatory view of a path candidate C6.

As illustrated in FIG. 11, in a case of operation mode 6 at time T1, the range setting unit 16 sets a path candidate C6 within a front range pM6 and a left range qM6 in front and left around the automobile 2. Since the automobile 2 goes straight forward, the path candidate C6 has a wider range than the path candidate C3.

Figure 12:
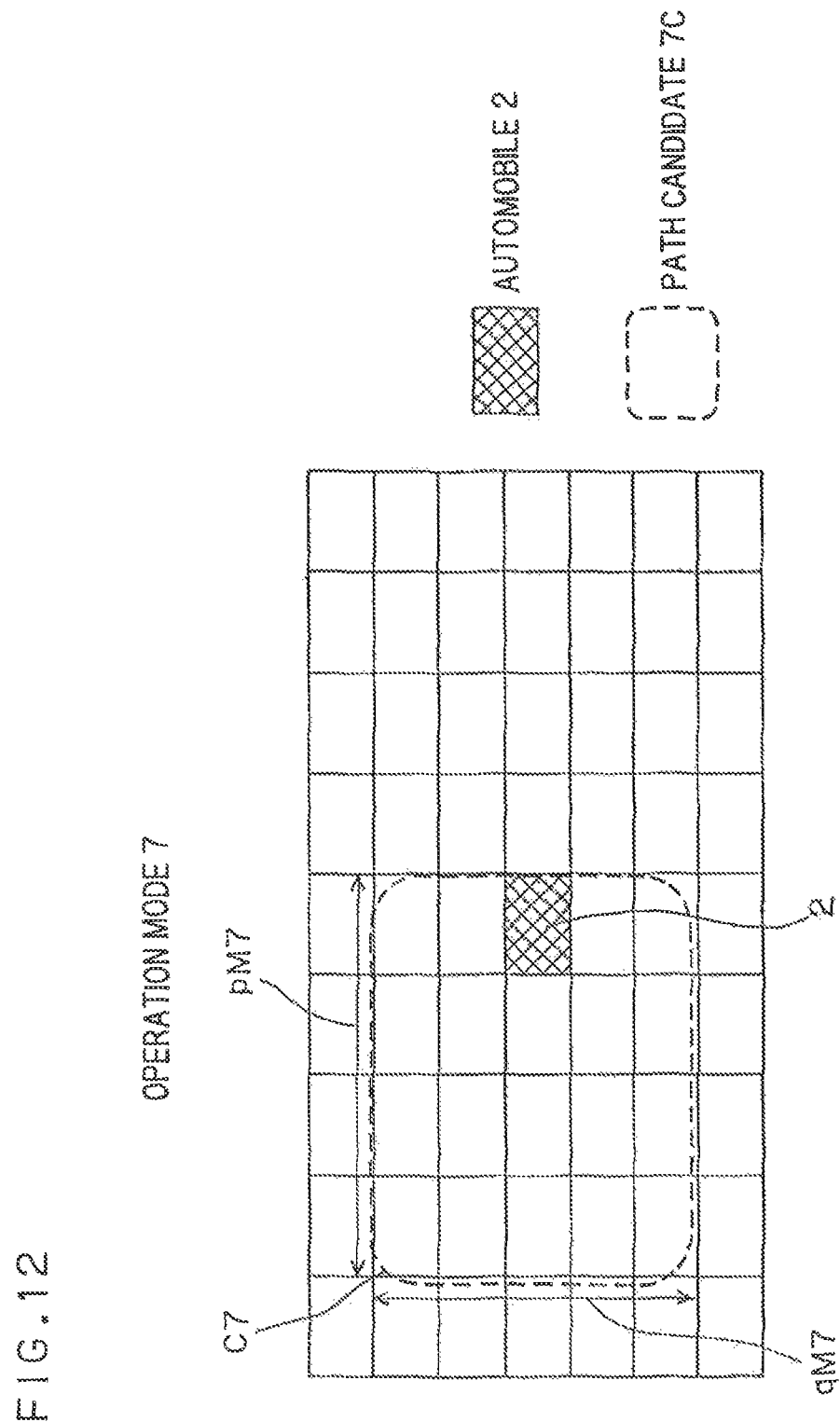
FIG. 12 is an explanatory view of a path candidate C7.

As illustrated in FIG. 12, in a case of operation mode 7 at time T1, the range setting unit 16 sets a path candidate C7 within a rear range pM7 and a left-right range qM7 in rear, left, and right around the automobile 2.

The method of setting a path candidate using the operation mode has been described above. However, in a case of autonomous car where a path is already calculated by a system, a range within which a path to be tracked by the system exists may be set as a path candidate, without using any operation mode.

Next, the range of interest A will be described. The range setting unit 16 represents and sets the range of interest A of the automobile 2 at time T1 in the three-dimensional range in the camera coordinate system from the path candidate C at time T1, the movement destination D of other moving body predicted by the prediction unit 15 and the environment information acquired by the environment acquisition unit 14.

Figure 13:
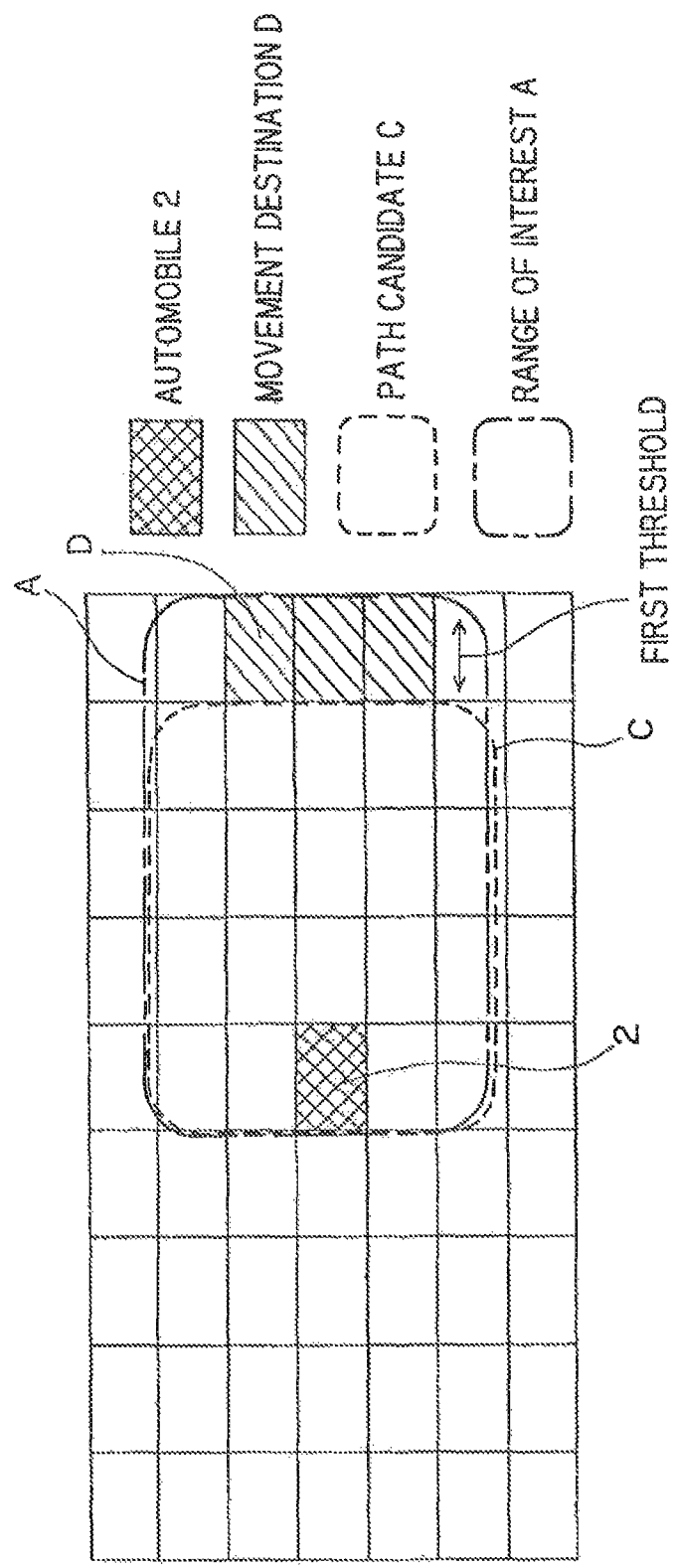
FIG. 13 is an explanatory view of a movement destination D.

As illustrated in FIG. 13, when the movement destination D of other moving body lies within predetermined distance data (first threshold) from the end of the path candidate C at time T1, the range setting unit 16 represents and sets a range including the movement destination D of other moving body as the range of interest A in the camera coordinate system.

Figure 14:
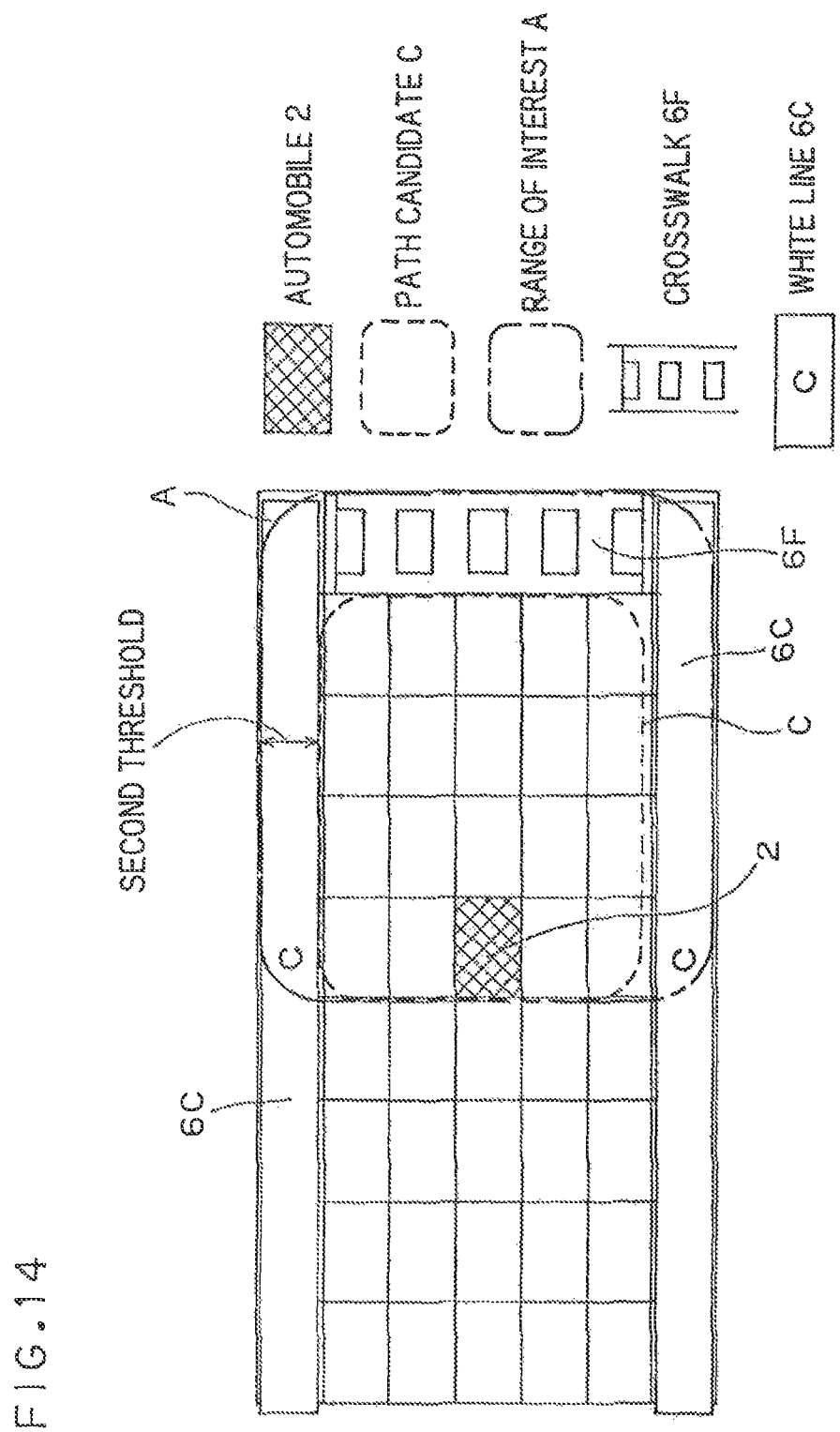
FIG. 14 is an explanatory view of environment information.

As illustrated in FIG. 14, when the environment object 6 of the environment information lies within predetermined distance data (second threshold) from the end of the path candidate C at time T1, the range setting unit 16 represents and sets a range including the environment object 6 of the environment information as the range of interest A in the three-dimensional range in the camera coordinate system.

Figure 15:
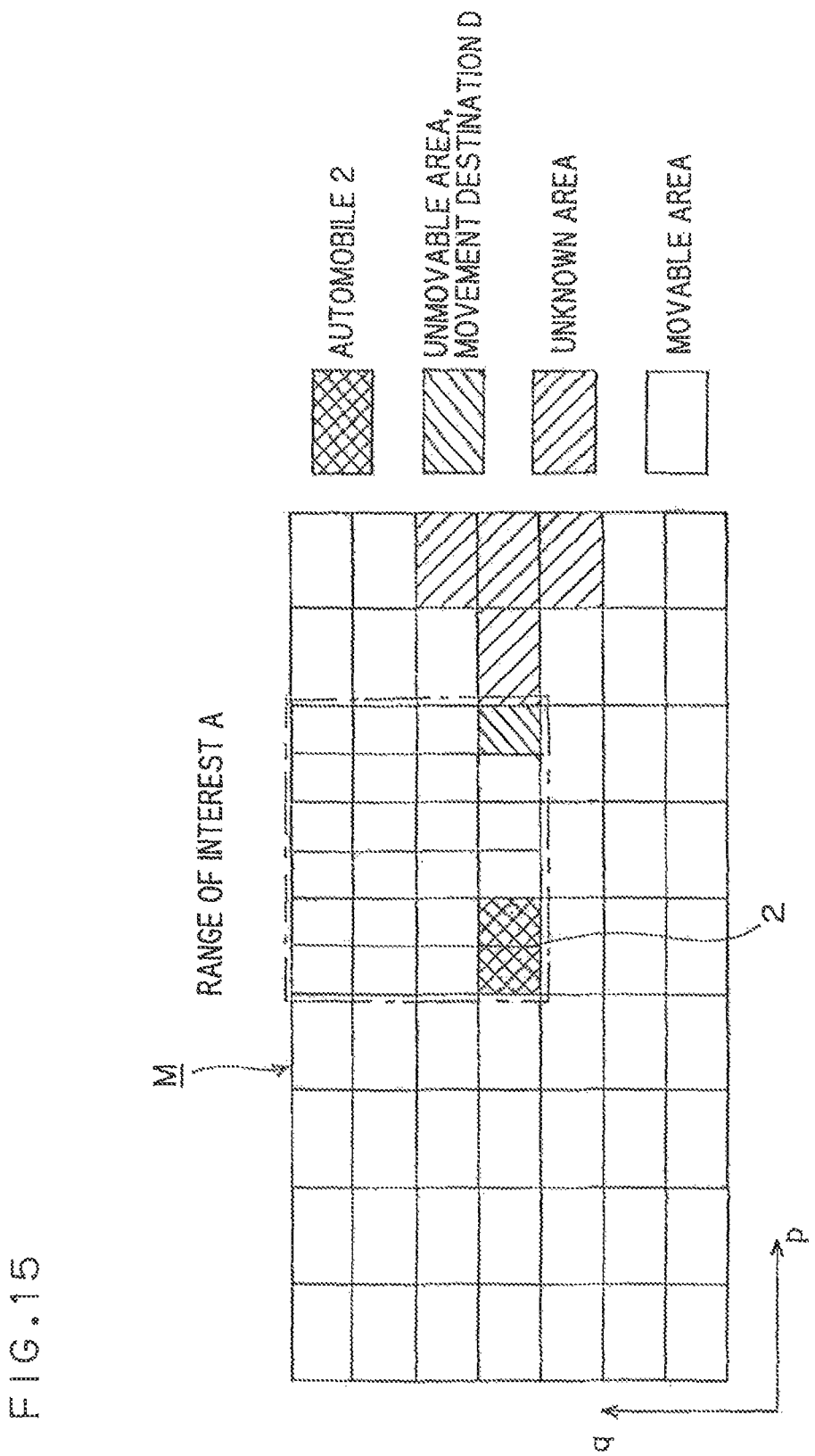
FIG. 15 is an explanatory view of an occupancy grid map M.

As illustrated in FIG. 15, the range setting unit 16 sets the range of interest A to a resolution higher than the resolution of pixels of the occupancy grid map M. For example, when the pixel size of the occupancy grid map M is 1.0 m, the range of interest A is set to a smaller pixel size (0.5 m). The reason why the range setting unit 16 may set the range of interest A to this smaller pixel size is that the movement destination D of other moving body predicted by the prediction unit 15 and the environment information acquired by the environment acquisition unit 14 have a high resolution in the distance data in the camera coordinate system.

The generation unit 17 will be described. The generation unit 17 generates an occupancy grid map M of the surroundings of the automobile 2 at time T1 from the distance data acquired by the distance data acquisition unit 11 at time T1, the attitude and the status of movement in real scale of the automobile 2 calculated by the motion calculation 12, and the range of interest A set by the range setting unit 16 (see, e.g., Step S7 in FIG. 2).

First, the generation unit 17 sets the movement destination D of other moving body expressed by the three-dimensional position or three-dimensional range of the camera coordinate system at time T1, the environment object 6 indicated by the environment information, the path candidate C and the range of interest A to respective pixels of the occupancy grid map M. In this case, the origin of the pixel orthogonal coordinate system, in the occupancy grid map M is aligned to the origin of the camera coordinate system, and the p axis of the pixel orthogonal coordinate system is aligned to the Z axis of the camera coordinate system. Then, for example, for the environment object 6, the environment object 6 is set to a pixel (pk, qz) in the pixel orthogonal coordinate system corresponding to a three-dimensional position (Xk, Yk, Zk) in the camera coordinate system of the environment object 6. In addition, for example, a vertical component Yk of the camera coordinate system is set to 0. Thus, the movement destination D of other moving body, the environment object 6, the path candidate C, and the range of interest A may be set to respective pixels of the occupancy grid map M around the automobile 2 at time T1.

Next, the generation unit 17 calculates a probability of existence of an obstacle (a probability value between 0 and 1, hereinafter referred to as an "obstacle existence probability") at each pixel of the occupancy grid map M and each pixel of a high resolution of the range of interest A in time series (for each time T) from the distance data acquired by the distance data acquisition unit 11.

As illustrated in FIG. 15, the generation unit 17 classifies each pixel of the occupancy grid map M and each pixel of a high resolution of the range of interest A into three states, i.e., a movable area (an area where an obstacle is not present), an immovable area (an area where an obstacle is present), and an unknown area (an area where it is known whether or not an obstacle is present). It is here assumed that the obstacle existence probabilities of the movable area, the unknown area, and the unmovable area are about 1.0, about 0.5, and about 0.0. Hereinafter, the classifying method will be described.

First, the generation unit 17 transforms the data (observation value) of a distance to an ambient object obtained for each time T by means of the laser sensor 4 installed in the automobile 2 into the pixel orthogonal coordinate system of the occupancy grid map M. In addition, in this transformation, only the range of interest A is transformed to a high resolution. The reason why only the range of interest A may be transformed to a high resolution is that the movement destination D of other moving body predicted by the prediction unit 15 and the environment information acquired by the environment acquisition unit 14 have a high resolution in the distance data in the camera coordinate system.

Second, the generation unit 17 generates the movable area (an area where an obstacle is not present), the immovable area (an area where an obstacle is present), and the unknown area (an area where it is known whether or not an obstacle is present) in each pixel of the occupancy grid map M and each pixel of a high resolution of the range of interest A (a ray casting process). The movable area is a pixel area from the automobile 2 (the laser sensor 4) lying in the center of the occupancy grid map M up to an object from which distance data can be obtained. The unmovable area is a pixel area corresponding to the distance data acquired from the laser sensor 4. The unknown area is a pixel area earlier than the unmovable area. The generation unit 17 obtains an index of a corresponding pixel for each angle resolution of the laser sensor 4 in advance (a pre-casting process) and updates the pixel based on the obtained pixel index. As the pre-casting process, all pixels are searched in advance and indexes of corresponding pixels of bins for each angle resolution of the laser sensor 4 are added to a database under a state where these pixel indexes are sorted into data of a distance from the center of the laser sensor 4. The use of the database in which the pixel indexes are registered eliminates a need to search pixels every time. In a case where the pixel indexes are not obtained in advance, a ray casting process may be performed in a polar coordinate system for each laser sensor 4, and a result of the ray casting process may be transformed into a pixel orthogonal coordinate system.

Third, the generation unit 17 calculates an obstacle existence probability in the unit of pixel of the occupancy grid map M and in the unit of pixel of a high resolution of the range of interest A from the distance data observed by the laser sensor 4. In the calculation, the calculated obstacle existence probability is propagated to neighboring pixels based on an error variance by the distance data. In actuality, a likelihood is calculated by applying distance data on a beam direction to a Gaussian distribution. In addition, for pixels in which a plurality of laser sensors 4 observes the distance data at the same time, calculated obstacle existence probabilities are integrated. As a way of the integration, a probability of a laser sensor 4 having a small error is adopted. For other moving body, there is a method of transitioning the obstacle existence probability to the movement destination D of other moving body, etc., predicted by the prediction unit 15.

Figure 2:
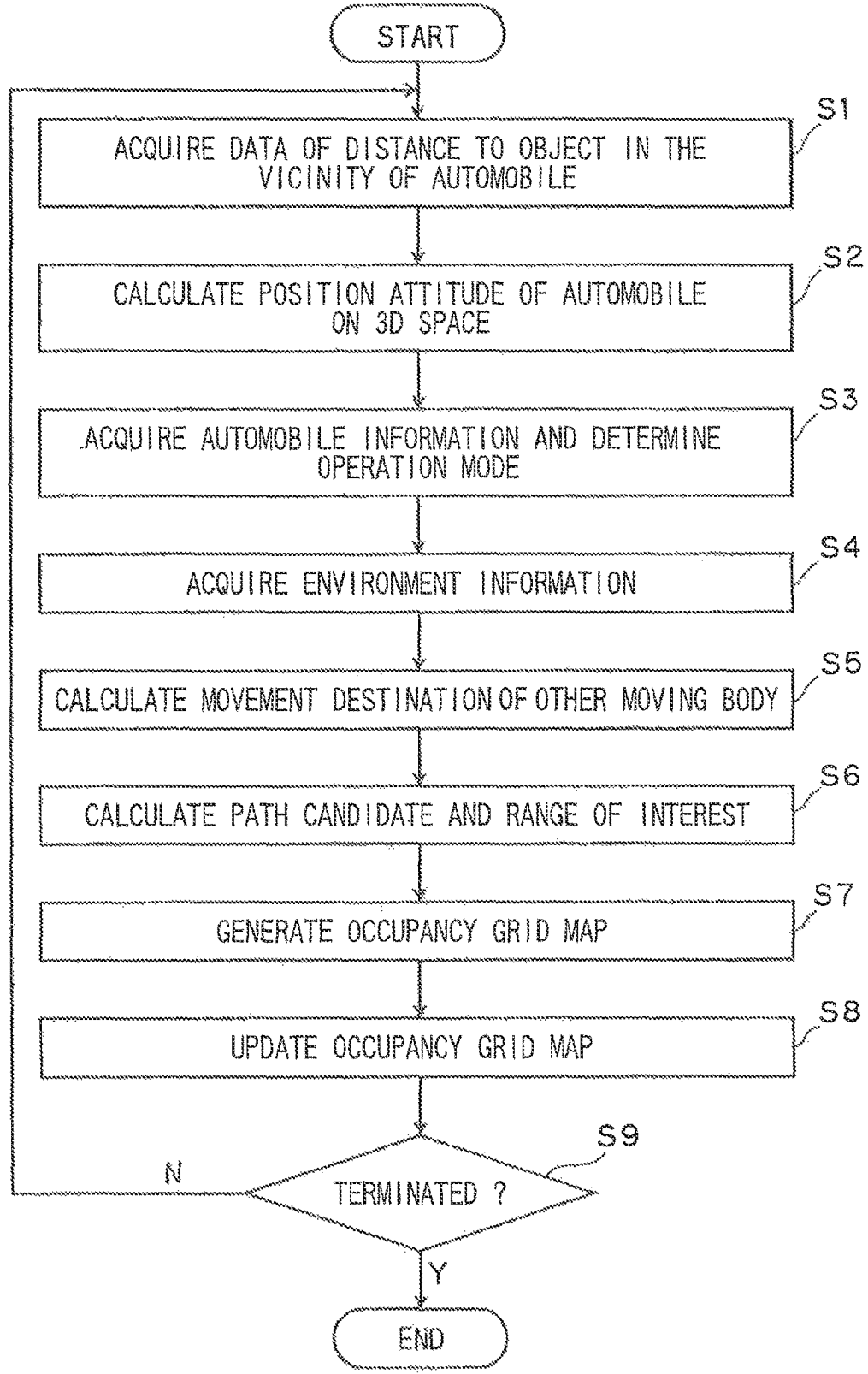
FIG. 2 is a flow chart illustrating a process of an occupancy grid map generating apparatus 1.

Fourth, the generation unit 17 coordinate-transforms the occupancy grid map M and range of interest A centered at the automobile 2 at time T1 to an occupancy grid map M and range of interest A centered at the automobile 2 at next time T2, based on the attitude and the status of movement in real scale of the automobile 2 calculated by the motion calculation unit 12 (see, e.g., Step S8 in FIG. 2). This coordinate transformation is performed in the pixel orthogonal coordinate system.

The generation unit 17 calculates and updates the obstacle existence probability of each pixel of the coordinate-transformed occupancy grid map M at time T2 and the obstacle existence probability of each pixel of a high resolution of the coordinate-transformed occupancy grid map M at time T2 of the coordinate transformation according to Bayes' theorem. For this update, the obstacle existence probability observed at time T1 is propagated to the occupancy grid map M and the range of interest A at time T2. An event observed that an obstacle is present is represented as O. An event O occurs in pixels labeled as "unmovable area." A complementary set of the event O occurs in pixels labeled as "movable area." Hone of the event O and complementary set of the event O occurs in pixels labeled as "unknown area", because no information is obtained from the observation at time T1. Specifically, the occupancy grid map M and the range of interest A are updated as follows.

First, an event that an obstacle is present is expressed by E, and an obstacle existence probability at a pixel of the occupancy grid map M and a pixel of a high resolution of the range of interest A is expressed by P(E). The occupancy grid map M and the range of interest A are updated by calculating the following conditional probability.

For pixel where event O occurs: P(E|O)
For pixel where event $\overline{O}$ (complementary set of events O) occurs: P(E|$\overline{O}$)

This probability is calculated according to the equation (2) using Bayes' theorem.

$$P(E \mid O) = \frac{P(O \mid E)P(E)}{P(O \mid E)P(E) + P(O \mid \overline{E})P(\overline{E})} \quad (2)$$

$$P(E \mid \overline{O}) = \frac{P(\overline{O} \mid E)P(E)}{P(\overline{O} \mid E)P(E) + P(\overline{O} \mid \overline{E})P(\overline{E})}$$

Where, P(E) is a priori probability and has an initial value of 0.5.
P(E|O) and P(E|$\overline{O}$) are determined to calculate Equation (2). These correspond to incorrect model of sensor.
Other terms are obtained from P($\overline{O}$|E)=1−P(O|E), P($\overline{O}$|$\overline{E}$)=1−P(O|$\overline{E}$), P($\overline{E}$)=1−P(E).

The updating method in the Bayes' theorem may be an updating method using only a probability value before one time in a time-series manner or a Bayes estimating method based on probability fluctuation over multiple times. In addition, a general method of updating a time-series probability value according to the Bayes' theorem may be employed.

The generation unit 17 updates the obstacle existence probability for each pixel of the occupancy grid map M at time T1 and each pixel of a high resolution of the range of interest A at time T1 independently (an independent assumption) and obtains the occupancy grid map M at time T2 and the range of interest A time T2.

Fifth, when the automobile 2 arrives at the destination, the generation unit 17 ends the update of the occupancy grid map M (see, e.g., Step S9 in FIG. 2).

The occupancy grid map generating apparatus 1 of this embodiment can generate the range of interest A important for a path of the automobile 2 with a resolution higher than the resolution of pixels of the occupancy grid map M, based on the automobile information of the automobile 2, the predicted movement destination D of other moving body, and the environment object 6 indicated by the environment information, in generating a pixel type occupancy grid map M. This allows a running automobile 2 to avoid obstacles with higher reliability.

Second Embodiment

Next, an occupancy grid map generating apparatus 100 of a second embodiment will be described with reference to FIGS. 16 and 17. In this embodiment, a first moving body is a flying body 102 such as an unmanned aerial vehicle (UAV) moving in a three-dimensional space (hereinafter referred to as an "auto-flying body"). As illustrated in FIG. 17, an occupancy grid map M represents the presence or absence of an obstacle in the unit of voxel when the three-dimensional space is divided into cubic or rectangular parallelepiped lattice-like voxels.

Figure 16:
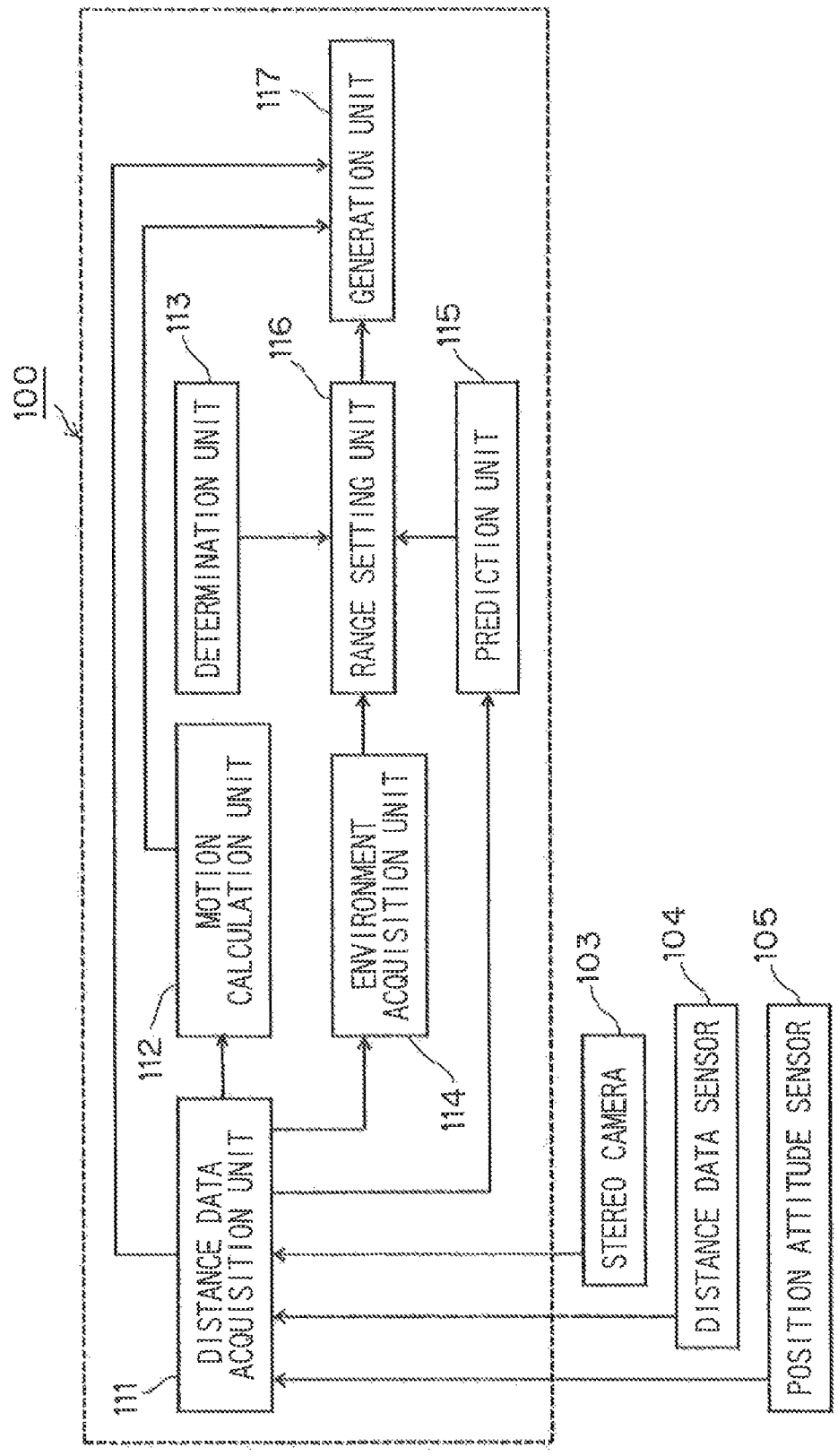
FIG. 16 is a block diagram illustrating an occupancy grid map generating apparatus according to a second embodiment.
Figure 17:
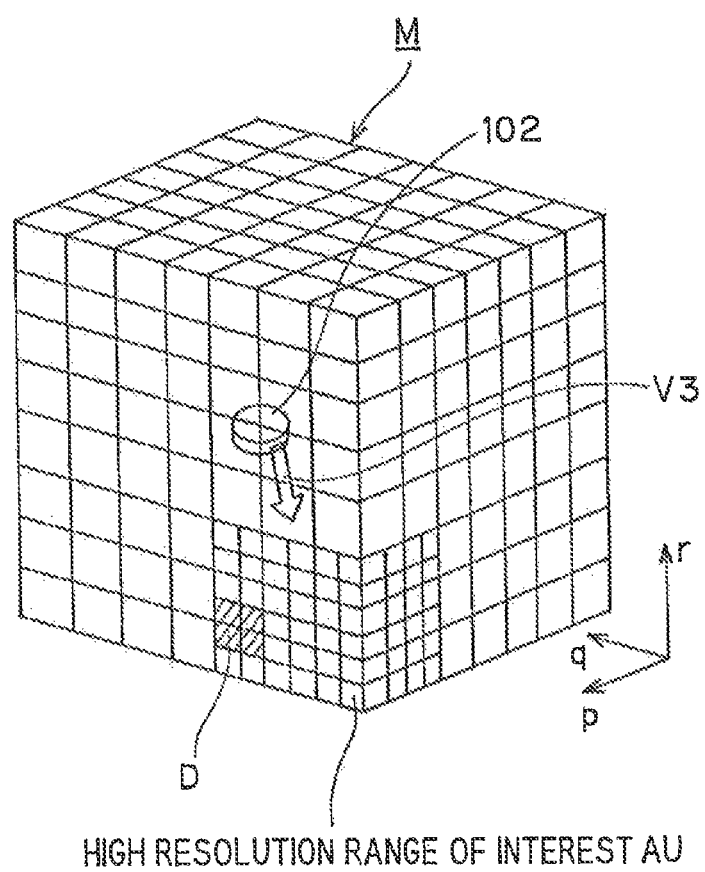
FIG. 17 is an explanatory view of an occupancy grid map.

As illustrated in a block diagram of FIG. 16, the occupancy grid map generating apparatus 100 of this embodiment includes a distance data acquisition unit 111, a motion calculation unit 112, a determination unit 113, an environment acquisition unit 114, a prediction unit 115, a range setting unit 116, and a generation unit 117. The following description will be focused on configurations and operations different from those in the first embodiment.

The auto-flying body 102 includes a stereo camera 103, a projection type distance data sensor 104, and a position attitude sensor 105 which acquires a three-dimensional position attitude of the auto-flying body 102. The position attitude sensor 105 is operated as follows by way of one example. When the stereo camera 103 is used, the position attitude sensor 105 calculates a three-dimensional position attitude according to a time-series process of the stereo camera 103. In addition, the position attitude sensor 105 acquires a three-dimensional position attitude by combining a global positioning system (GPS), a global navigation satellite system (GNSS), a position sensor such as an altimeter, an inertial measurement unit (IMU), and an attitude sensor such as a geomagnetism.

As illustrated in FIG. 17, a voxel orthogonal coordinate system is a three-dimensional orthogonal coordinate system which is composed of a p axis, a q axis, and an r axis and is set in a three-dimensional planar occupancy grid map M for each time T. The origin of the voxel orthogonal coordinate system is set at the center of the auto-flying body 102, the p axis is set in a movement direction of the auto-flying body 102, and the r axis is set in a height direction of the auto-flying body 102 at time T.

A camera coordinate system is a three-dimensional orthogonal coordinate system with its origin set at a position in the stereo camera 103 and is composed of a horizontal X axis, a vertical Y axis, and a depth-wise a axis. This origin is located on the center of the auto-flying body 102. The Z axis corresponds to the movement direction of the auto-flying body 102.

The distance data acquisition unit 111 acquires a group of images of an object (obstacle) in the 360° surroundings of the auto-flying body 102 and data of three-dimensional distance to the object in the camera coordinate system from the stereo camera 103 and the projection type distance data sensor 104.

The motion calculation unit 112 calculates the three-dimensional position, attitude and movement status of the auto-flying body 102 from the position attitude sensor 105.

The determination unit 113 calculates a "three-dimensional movement vector" indicating the movement direction of the auto-flying body 102 in the camera coordinate system, based on auto-information which is a command from a controller possessed by an external operator, when the auto-flying body 102 is in manual flight, and outputs the calculated movement vector to the range setting unit 116. When the auto-flying body 102 is in automatic flight, the determination unit 113 calculates the three-dimensional movement; vector of the auto-flying body 102 in the camera coordinate system, based on auto-information which is path (airway) information input in advance.

The environment acquisition unit 114 acquires environment information in the camera coordinate system and outputs it to the prediction unit 115. The "environment information" used in this embodiment may include information about flight possible altitude and airspace around the auto-flying body 102, which is regulated in an aviation law and so on, information about obstacles to limit, an airway, such as electric wires and billboards to be avoided, information about flight rules (e.g., restricted zones for flight over public properties), etc.

The prediction unit 115 calculates a solid object (obstacle) in the camera coordinate system, based on the group of images of the object and the data of three-dimensional distance to the object in the camera coordinate system, which are acquired by the distance data acquisition unit 111. The prediction unit 115 predicts a three-dimensional position of the solid object at nest time from a three-dimensional track obtained when the solid object is tracked in time-series, by means of a Kalman filter. The prediction unit 115 outputs the predicted three-dimensional position of the solid object to the range setting unit 116. Alternatively, the prediction method using the time-series information may use a particle filter or linear prediction assuming uniform linear motion or uniform accelerated motion. When the predicted three-dimensional position of the solid object is within an area to limit an air way based on the environment information, a three-dimensional position nearest from the predicted three-dimensional position of the solid object in an unlimited area is used as a new movement destination D of the solid object. In addition to this example, other methods may be used as long as they can predict an airway avoiding from the predicted three-dimensional position to the unlimited area.

The range setting unit 116 sets a three-dimensional range of interest in the camera coordinate system from the three-dimensional movement position in the camera coordinate system based on the three-dimensional movement vector of the auto-flying body 102 determined by the determination unit 113, the environment information in the camera coordinate system acquired by the environment acquisition unit 114, and the three-dimensional movement destination D of the obstacle in the camera coordinate system predicted by the prediction unit 115. In this case, the range setting unit 116 sets the voxel size of the range of interest A to be smaller than the voxel size of the occupancy grid map M and sets the range of interest A to a high resolution with the increased number of voxels.

The generation unit 117 sets the environment information of the camera coordinate system, the three-dimensional movement destination S of the obstacle, and the three-dimensional range of interest A in the occupancy grid map M. In this case, the origin of the voxel orthogonal coordinate system is aligned to the origin of the camera coordinate system, and the p axis of the voxel orthogonal coordinate system is aligned to the Z axis of the camera coordinate system.

According to the occupancy grid map generating apparatus 100 of this embodiment, with respect to an important range of an airway (path) of the auto-flying body 102, it is possible to generate the occupancy grid map M in the range of interest A.

Modification Example

Although it has been illustrated in the above embodiments that the stereo camera 3 is installed as an imaging device in the automobile 2, without being limited thereto, a 360° omnidirectional camera or a single camera may be employed as the imaging device.

In addition, although it has been illustrated in the above embodiments that a single laser sensor 4 is employed, a plurality of one-line horizontal line laser sensors 4 or a 360° rider radar sensor capable of acquiring 360° multiple lines at once may be employed. The cameras and lasers may be also replaced with other distance measurement sensors.

In addition, it has been illustrated in the above embodiments that the attitude and the status of movement in real scale of the automobile 2 are calculated from the left and right images 7L and 7R obtained by the stereo camera 3. However, for a single camera, since the real scale of the translation vector t is unknown, the real scale may be acquired from the laser sensor 4 or a separate sensor such as IMU (e.g., an acceleration sensor, a gyro sensor or the like). Further, the real scale may be calculated by IMU or GPS.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for generating, in a pixel orthogonal coordinate system, an occupancy grid map constituted with a two-dimensional grid around a first moving body, wherein
the pixel orthogonal coordinate system is a two-dimensional orthogonal coordinate system which is composed of a p axis and a q axis and is set for the occupancy grid map in a two-dimensional plane for each time T, an origin of the pixel orthogonal coordinate system is set at the first moving body, and a direction of the p axis is set at a runway direction of the first moving body at time T, and
a camera coordinate system is a three-dimensional orthogonal coordinate system which is composed of a horizontal X axis, a vertical Y axis, and a depth-wise Z axis and has a resolution higher than a resolution of the pixel orthogonal coordinate system, a position of an origin of the camera coordinate system is set at the first moving body, and the camera coordinate system is set such that the Z axis coincides with the p axis of the pixel orthogonal coordinate system,
the apparatus comprising processing circuitry configured to:
acquire a distance data at a current time from the first moving body to an obstacle in the camera coordinate system;
predict a position at a next time of the current time of the obstacle, from the distance data;
acquire first information indicating a movement status of the first moving body at current time;
determine an operation mode of the first moving body at the current time, from the first information;
obtain a movement range of the first moving body at the next time, from the operation mode;
set the movement range at the next time and a range of interest including a predicted position of the obstacle at the next time, in the same resolution as the resolution of the camera coordinate system;
align the occupancy grid map to the range of interest; and
generate the occupancy grid map in such a manner that the obstacle exists in the grid corresponding to a distance data in the occupancy grid map at the next time and the grid corresponding to the distance data in the range of interest at the next time.

2. The apparatus according to claim 1, wherein the processing circuitry is further configured to:
calculate a motion of the first moving body at the current time; and
update the occupancy grid map and the range of interest at the current time to the occupancy grid map and the range of interest at the next time, based on the motion of the first moving body.

3. The apparatus according to claim 1, wherein the processing circuitry is further configured to:
acquire environment information of a path of the first moving body; and
generate an environment object indicated by the environment information in the grid of the occupancy grid map and the grid of the range of interest, in addition to the obstacle represented by the distance data.

4. The apparatus according to claim 1, wherein the processing circuitry is further configured to:
predict a movement destination of a second moving body at the next time, the second moving body moving around the first moving body; and
generate the occupancy grid map in such a manner that the movement destination of the second moving body exists as the obstacle in the grid of the occupancy grid map and the grid of the range of interest in addition to the obstacle represented by the distance data.

5. The apparatus according to claim 1, wherein the determined operation mode is one of an operation mode of a stop state of the first moving body, an operation mode of a stop state for right turn, an operation mode of a stop state for left turn, an operation mode of forward straight, an operation mode of forward straight for right turn, an operation mode of forward straight for left turn, and an operation mode of backward straight.

6. The apparatus according to claim 5, wherein the processing circuitry is further configured to:
   generate a path candidate, which is a candidate of a range of movement of the first moving body, using the operation mode; and
   set the range of interest to include an environment object indicated by environment information in the path candidate.

7. The apparatus according to claim 5, wherein the processing circuitry is further configured to:
   generate a path candidate, which is a candidate of a range of movement of the first moving body, using the operation mode; and
   set the range of interest to include a movement destination in the path candidate.

8. A method for generating, in a pixel orthogonal coordinate system, an occupancy grid map constituted with a two-dimensional grid around a first moving body, wherein
   the pixel orthogonal coordinate system is a two-dimensional orthogonal coordinate system which is composed of a p axis and a q axis and is set for the occupancy grid map in a two-dimensional plane for each time T, an origin of the pixel orthogonal coordinate system is set at the first moving body, and a direction of the p axis is set at a runway direction of the first moving body at time T, and
   a camera coordinate system is a three-dimensional orthogonal coordinate system which is composed of a horizontal X axis, a vertical Y axis, and a depth-wise Z axis and has a resolution higher than a resolution of the pixel orthogonal coordinate system, a position of an origin of the camera coordinate system is set at the first moving body, and the camera coordinate system is set such that the Z axis coincides with the p axis of the pixel orthogonal coordinate system,
   the method comprising:
      acquiring a distance data at a current time from the first moving body to an obstacle in the camera coordinate system;
      predicting a position at a next time of the current time of the obstacle, from the distance data;
      acquiring first information indicating a movement status of the first moving body at current time;
      determining an operation mode of the first moving body at the current time, from the first information;
      obtaining a movement range of the first moving body at the next time, from the operation mode;
      setting the movement range at the next time and a range of interest including a predicted position of the obstacle at the next time, in the same resolution as the resolution of the camera coordinate system;
      aligning the occupancy grid map to the range of interest; and
      generating the occupancy grid map in such a manner that the obstacle exists in the grid corresponding to a distance data in the occupancy grid map at the next time and the grid corresponding to the distance data in the range of interest at the next time.

9. A program stored in a non-transitory computer readable medium, causing a computer to perform a method for generating, in a pixel orthogonal coordinate system, an occupancy grid map composed of a two-dimensional grid around a first moving body, wherein
   the pixel orthogonal coordinate system is a two-dimensional orthogonal coordinate system which is composed of a p axis and a q axis and is set for the occupancy grid map in a two-dimensional plane for each time T, an origin of the pixel orthogonal coordinate system is set at the first moving body, and a direction of the p axis is set at a runway direction of the first moving body at time T, and
   a camera coordinate system is a three-dimensional orthogonal coordinate system which is composed of a horizontal X axis, a vertical Y axis, and a depth-wise Z axis and has a resolution higher than a resolution of the pixel orthogonal coordinate system, a position of an origin of the camera coordinate system is set at the first moving body, and the camera coordinate system is set such that the Z axis coincides with the p axis of the pixel orthogonal coordinate system,
   acquiring a distance data at a current time from the first moving body to an obstacle in the camera coordinate system;
   predicting a position at a next time of the current time of the obstacle, from the distance data;
   acquiring first information indicating a movement status of the first moving body at current time;
   determining an operation mode of the first moving body at the current time, from the first information;
   obtaining a movement range of the first moving body at the next time, from the operation mode;
   setting the movement range at the next time and a range of interest including a predicted position of the obstacle at the next time, in the same resolution as the resolution of the camera coordinate system;
   aligning the occupancy grid map to the range of interest; and
   generating the occupancy grid map in such a manner that the obstacle exists in the grid corresponding to a distance data in the occupancy grid map at the next time and the grid corresponding to the distance data in the range of interest at the next time.

10. An apparatus for generating an occupancy grid map around a first moving body in a pixel orthogonal coordinate system constituted with a three-dimensional grid for each predetermined time, wherein
   the pixel orthogonal coordinate system is a three-dimensional orthogonal coordinate system which is composed of a p axis, a q axis, and an r axis and is set for the occupancy grid map in a three-dimensional plane for each time T, an origin of the pixel orthogonal coordinate system is set at the first moving body, and a direction of the p axis is set at a runway direction of the first moving body at time T, and
   a camera coordinate system is a three-dimensional orthogonal coordinate system which is composed of a horizontal X axis, a vertical Y axis, and a depth-wise Z axis and has a resolution higher than a resolution of the pixel orthogonal coordinate system, a position of an origin of the camera coordinate system is set at the first moving body, and the camera coordinate system is set such that the Z axis coincides with the p axis of the pixel orthogonal coordinate system,
   the apparatus comprising processing circuitry configured to:
      acquire a data distance at a current time from the first moving body to an obstacle, in the camera coordinate system;

predict a position at a next time of the current time of the obstacle from the distance data;

acquire first information indicating a movement status of the first moving body at current time;

determine an operation mode of the first moving body at the current time, from the first information;

obtain a movement range of the first moving body at the next time, from the operation mode;

set the movement range at the next time and a range of interest including a predicted position of the obstacle at the next time, in the same resolution as the resolution of the camera coordinate system;

align the occupancy grid map to the range of interest; and generate the occupancy grid map in such a manner that the obstacle exists in the grid corresponding to a distance data in the occupancy grid map at the next time and the grid corresponding to the distance data in the range of interest at the next time.

11. A method for generating an occupancy grid map around a first moving body in a pixel orthogonal coordinate system constituted with a three-dimensional grid for each predetermined time, wherein the pixel orthogonal coordinate system is a three-dimensional orthogonal coordinate system which is composed of a p axis, a q axis, and an r axis and is set for the occupancy grid map in a three-dimensional plane for each time T, an origin of the pixel orthogonal coordinate system is set at the first moving body, and a direction of the p axis is set at a runway direction of the first moving body at time T, and a camera coordinate system is a three-dimensional orthogonal coordinate system which is composed of a horizontal X axis, a vertical Y axis, and a depth-wise Z axis and has a resolution higher than a resolution of the pixel orthogonal coordinate system, a position of an origin of the camera coordinate system is set at the first moving body, and the camera coordinate system is set such that the Z axis coincides with the p axis of the pixel orthogonal coordinate system, the method comprising:

acquiring a data distance at a current time from the first moving body to an obstacle, in the camera coordinate system;

predicting a position at a next time of the current time of the obstacle from the distance data;

acquiring first information indicating a movement status of the first moving body at current time;

determining an operation mode of the first moving body at the current time, from the first information;

setting the movement range at the next time and a range of interest including a predicted position of the obstacle at the next time, in the same resolution as the resolution of the camera coordinate system;

aligning the occupancy grid map to the range of interest; and generating the occupancy grid map in such a manner that the obstacle exists in the grid corresponding to a distance data in the occupancy grid map at the next time and the grid corresponding to the distance data in the range of interest at the next time.

12. A program stored in a non-transitory computer readable medium, causing a computer to perform a method for generating an occupancy grid map around a first moving body in a pixel orthogonal coordinate system constituted with a three-dimensional grid for each predetermined time, wherein the pixel orthogonal coordinate system is a three-dimensional orthogonal coordinate system which is composed of a p axis, a q axis, and an r axis and is set for the occupancy grid map in a three-dimensional plane for each time T, an origin of the pixel orthogonal coordinate system is set at the first moving body, and a direction of the p axis is set at a runway direction of the first moving body at time T, and a camera coordinate system is a three-dimensional orthogonal coordinate system which is composed of a horizontal X axis, a vertical Y axis, and a depth-wise Z axis and has a resolution higher than a resolution of the pixel orthogonal coordinate system, a position of an origin of the camera coordinate system is set at the first moving body, and the camera coordinate system is set such that the Z axis coincides with the p axis of the pixel orthogonal coordinate system, the method comprising:

acquiring a data distance at a current time from the first moving body to an obstacle, in the camera coordinate system;

predicting a position at a next time of the current time of the obstacle from the distance data;

acquiring first information indicating a movement status of the first moving body at current time;

determining an operation mode of the first moving body at the current time, from the first information;

setting the movement range at the next time and a range of interest including a predicted position of the obstacle at the next time, in the same resolution as the resolution of the camera coordinate system;

aligning the occupancy grid map to the range of interest; and generating the occupancy grid map in such a manner that the obstacle exists in the grid corresponding to a distance data in the occupancy grid map at the next time and the grid corresponding to the distance data in the range of interest at the next time.

* * * * *